United States Patent
Martin

(10) Patent No.: US 10,185,891 B1
(45) Date of Patent: Jan. 22, 2019

(54) SYSTEMS AND METHODS FOR COMPACT CONVOLUTIONAL NEURAL NETWORKS

(71) Applicant: GOPRO, INC., San Mateo, CA (US)

(72) Inventor: Louis Martin, Orsay (FR)

(73) Assignee: GoPro, Inc., San Mateo, CA (US)

( * ) Notice: Subject to any disclaimer, the term of this patent is extended or adjusted under 35 U.S.C. 154(b) by 242 days.

(21) Appl. No.: 15/206,150

(22) Filed: Jul. 8, 2016

(51) Int. Cl.
G06K 9/00 (2006.01)
G06K 9/62 (2006.01)
G06N 3/08 (2006.01)

(52) U.S. Cl.
CPC ......... G06K 9/624 (2013.01); G06K 9/00288 (2013.01); G06K 9/6218 (2013.01); G06K 9/6262 (2013.01); G06N 3/08 (2013.01)

(58) Field of Classification Search
CPC .. G06K 9/624; G06K 9/00288; G06K 9/6262; G06K 9/6218; G06N 3/08
See application file for complete search history.

(56) References Cited

U.S. PATENT DOCUMENTS

| | | | |
|---|---|---|---|
| 5,130,794 A | 7/1992 | Ritchey | |
| 6,337,683 B1 | 1/2002 | Gilbert | |
| 6,593,956 B1 | 7/2003 | Potts | |
| 7,222,356 B1 | 5/2007 | Yonezawa | |
| 7,483,618 B1 | 1/2009 | Edwards | |
| 8,446,433 B1 | 5/2013 | Mallet | |
| 8,611,422 B1 | 12/2013 | Yagnik | |
| 8,718,447 B2 | 5/2014 | Yang | |
| 8,730,299 B1 | 5/2014 | Kozko | |
| 8,763,023 B1 | 6/2014 | Goetz | |
| 8,910,046 B2 | 12/2014 | Matsuda | |

(Continued)

FOREIGN PATENT DOCUMENTS

| | | |
|---|---|---|
| WO | 2001020466 | 3/2001 |
| WO | 2009040538 | 4/2009 |

OTHER PUBLICATIONS

Kalinovskii, I.A., "Compact Convolutional Neural Network Cascade for Face Detection", 2015.*

(Continued)

*Primary Examiner* — Aaron W Carter
(74) *Attorney, Agent, or Firm* — Sheppard Mullin Richter & Hampton LLP

(57) ABSTRACT

A compact convolutional neural network may include a preliminary layer group, one or more intermediate layer groups, a final layer group, and/or other layers/layer groups. The preliminary layer group may include an input layer, a first preliminary normalization layer, a preliminary padding layer, a preliminary convolution layer, a preliminary activation layer, a second preliminary normalization layer, and a preliminary downsampling layer. One or more intermediate layer groups may include an intermediate squeeze layer, a first intermediate normalization layer, an intermediate padding layer, a first intermediate expand layer, a second intermediate expand layer, an intermediate concatenation layer, a second intermediate normalization layer, an intermediate activation layer, and an intermediate combination layer. The final layer group may include a final dropout layer, a final convolution layer, a final activation layer, a first final normalization layer, a final downsampling layer, a final flatten layer, and a second final normalization layer.

20 Claims, 19 Drawing Sheets

(56) References Cited

U.S. PATENT DOCUMENTS

| | | |
|---|---|---|
| 8,988,509 B1 | 3/2015 | Macmillan |
| 9,032,299 B2 | 5/2015 | Lyons |
| 9,036,001 B2 | 5/2015 | Chuang |
| 9,077,956 B1 | 7/2015 | Morgan |
| 9,111,579 B2 | 8/2015 | Meaney |
| 9,142,253 B2 | 9/2015 | Ubillos |
| 9,151,933 B2 | 10/2015 | Sato |
| 9,204,039 B2 | 12/2015 | He |
| 9,208,821 B2 | 12/2015 | Evans |
| 9,245,582 B2 | 1/2016 | Shore |
| 9,253,533 B1 | 2/2016 | Morgan |
| 9,317,172 B2 | 4/2016 | Lyons |
| 9,423,944 B2 | 8/2016 | Eppolito |
| 9,473,758 B1 | 10/2016 | Long |
| 9,479,697 B2 | 10/2016 | Aguilar |
| 9,564,173 B2 | 2/2017 | Swenson |
| 9,953,679 B1 * | 4/2018 | Tse .................. G11B 27/031 |
| 2004/0128317 A1 | 7/2004 | Sull |
| 2005/0025454 A1 | 2/2005 | Nakamura |
| 2006/0122842 A1 | 6/2006 | Herberger |
| 2007/0173296 A1 | 7/2007 | Hara |
| 2007/0204310 A1 | 8/2007 | Hua |
| 2007/0230461 A1 | 10/2007 | Singh |
| 2008/0044155 A1 | 2/2008 | Kuspa |
| 2008/0123976 A1 | 5/2008 | Coombs |
| 2008/0152297 A1 | 6/2008 | Ubillos |
| 2008/0163283 A1 | 7/2008 | Tan |
| 2008/0177706 A1 | 7/2008 | Yuen |
| 2008/0208791 A1 | 8/2008 | Das |
| 2008/0253735 A1 | 10/2008 | Kuspa |
| 2008/0313541 A1 | 12/2008 | Shafton |
| 2009/0213270 A1 | 8/2009 | Ismert |
| 2009/0274339 A9 | 11/2009 | Cohen |
| 2009/0327856 A1 | 12/2009 | Mouilleseaux |
| 2010/0045773 A1 | 2/2010 | Ritchey |
| 2010/0064219 A1 | 3/2010 | Gabrisko |
| 2010/0086216 A1 | 4/2010 | Lee |
| 2010/0104261 A1 | 4/2010 | Liu |
| 2010/0183280 A1 | 7/2010 | Beauregard |
| 2010/0231730 A1 | 9/2010 | Ichikawa |
| 2010/0245626 A1 | 9/2010 | Woycechowsky |
| 2010/0251295 A1 | 9/2010 | Amento |
| 2010/0278504 A1 | 11/2010 | Lyons |
| 2010/0278509 A1 | 11/2010 | Nagano |
| 2010/0281375 A1 | 11/2010 | Pendergast |
| 2010/0281386 A1 | 11/2010 | Lyons |
| 2010/0287476 A1 | 11/2010 | Sakai |
| 2010/0299630 A1 | 11/2010 | McCutchen |
| 2010/0318660 A1 | 12/2010 | Balsubramanian |
| 2010/0321471 A1 | 12/2010 | Casolara |
| 2011/0025847 A1 | 2/2011 | Park |
| 2011/0069148 A1 | 3/2011 | Jones |
| 2011/0069189 A1 | 3/2011 | Venkataraman |
| 2011/0075990 A1 | 3/2011 | Eyer |
| 2011/0093798 A1 | 4/2011 | Shahraray |
| 2011/0134240 A1 | 6/2011 | Anderson |
| 2011/0173565 A1 | 7/2011 | Ofek |
| 2011/0206351 A1 | 8/2011 | Givoly |
| 2011/0211040 A1 | 9/2011 | Lindemann |
| 2011/0258049 A1 | 10/2011 | Ramer |
| 2011/0293250 A1 | 12/2011 | Deever |
| 2011/0320322 A1 | 12/2011 | Roslak |
| 2012/0014673 A1 | 1/2012 | O'Dwyer |
| 2012/0027381 A1 | 2/2012 | Kataoka |
| 2012/0030029 A1 | 2/2012 | Flinn |
| 2012/0057852 A1 | 3/2012 | Devleeschouwer |
| 2012/0123780 A1 | 5/2012 | Gao |
| 2012/0127169 A1 | 5/2012 | Barcay |
| 2012/0206565 A1 | 8/2012 | Villmer |
| 2012/0311448 A1 | 12/2012 | Achour |
| 2013/0024805 A1 | 1/2013 | In |
| 2013/0044108 A1 | 2/2013 | Tanaka |
| 2013/0058532 A1 | 3/2013 | White |
| 2013/0063561 A1 | 3/2013 | Stephan |
| 2013/0078990 A1 | 3/2013 | Kim |
| 2013/0127636 A1 | 5/2013 | Aryanpur |
| 2013/0136193 A1 | 5/2013 | Hwang |
| 2013/0142384 A1 | 6/2013 | Ofek |
| 2013/0151970 A1 | 6/2013 | Achour |
| 2013/0166303 A1 | 6/2013 | Chang |
| 2013/0191743 A1 | 7/2013 | Reid |
| 2013/0195429 A1 | 8/2013 | Fay |
| 2013/0197967 A1 | 8/2013 | Pinto |
| 2013/0208134 A1 | 8/2013 | Hamalainen |
| 2013/0208942 A1 | 8/2013 | Davis |
| 2013/0215220 A1 | 8/2013 | Wang |
| 2013/0259399 A1 | 10/2013 | Ho |
| 2013/0263002 A1 | 10/2013 | Park |
| 2013/0283301 A1 | 10/2013 | Avedissian |
| 2013/0287214 A1 | 10/2013 | Resch |
| 2013/0287304 A1 | 10/2013 | Kimura |
| 2013/0300939 A1 | 11/2013 | Chou |
| 2013/0308921 A1 | 11/2013 | Budzinski |
| 2013/0318443 A1 | 11/2013 | Bachman |
| 2013/0343727 A1 | 12/2013 | Rav-Acha |
| 2014/0026156 A1 | 1/2014 | Deephanphongs |
| 2014/0064706 A1 | 3/2014 | Lewis, II |
| 2014/0072285 A1 | 3/2014 | Shynar |
| 2014/0093164 A1 | 4/2014 | Noorkami |
| 2014/0096002 A1 | 4/2014 | Dey |
| 2014/0105573 A1 | 4/2014 | Hanckmann |
| 2014/0161351 A1 | 6/2014 | Yagnik |
| 2014/0165119 A1 | 6/2014 | Liu |
| 2014/0169766 A1 | 6/2014 | Yu |
| 2014/0176542 A1 | 6/2014 | Shohara |
| 2014/0193040 A1 | 7/2014 | Bronshtein |
| 2014/0212107 A1 | 7/2014 | Saint-Jean |
| 2014/0219634 A1 | 8/2014 | McIntosh |
| 2014/0226953 A1 | 8/2014 | Hou |
| 2014/0232818 A1 | 8/2014 | Carr |
| 2014/0232819 A1 | 8/2014 | Armstrong |
| 2014/0245336 A1 | 8/2014 | Lewis, II |
| 2014/0300644 A1 | 10/2014 | Gillard |
| 2014/0328570 A1 | 11/2014 | Cheng |
| 2014/0341528 A1 | 11/2014 | Mahate |
| 2014/0366052 A1 | 12/2014 | Ives |
| 2014/0376876 A1 | 12/2014 | Bentley |
| 2015/0015680 A1 | 1/2015 | Wang |
| 2015/0022355 A1 | 1/2015 | Pham |
| 2015/0029089 A1 | 1/2015 | Kim |
| 2015/0058709 A1 | 2/2015 | Zaletel |
| 2015/0085111 A1 | 3/2015 | Lavery |
| 2015/0154452 A1 | 6/2015 | Bentley |
| 2015/0178915 A1 | 6/2015 | Chatterjee |
| 2015/0186073 A1 | 7/2015 | Pacurariu |
| 2015/0220504 A1 | 8/2015 | Bocanegra Alvarez |
| 2015/0254871 A1 | 9/2015 | Macmillan |
| 2015/0256746 A1 | 9/2015 | Macmillan |
| 2015/0256808 A1 | 9/2015 | Macmillan |
| 2015/0271483 A1 | 9/2015 | Sun |
| 2015/0287435 A1 | 10/2015 | Land |
| 2015/0294141 A1 | 10/2015 | Molyneux |
| 2015/0318020 A1 | 11/2015 | Pribula |
| 2015/0339324 A1 | 11/2015 | Westmoreland |
| 2015/0375117 A1 | 12/2015 | Thompson |
| 2015/0382083 A1 | 12/2015 | Chen |
| 2016/0005435 A1 | 1/2016 | Campbell |
| 2016/0005440 A1 | 1/2016 | Gower |
| 2016/0026874 A1 | 1/2016 | Hodulik |
| 2016/0027470 A1 | 1/2016 | Newman |
| 2016/0027475 A1 | 1/2016 | Hodulik |
| 2016/0029105 A1 | 1/2016 | Newman |
| 2016/0055885 A1 | 2/2016 | Hodulik |
| 2016/0088287 A1 | 3/2016 | Sadi |
| 2016/0098941 A1 | 4/2016 | Kerluke |
| 2016/0119551 A1 | 4/2016 | Brown |
| 2016/0217325 A1 | 7/2016 | Bose |
| 2016/0225405 A1 | 8/2016 | Matias |
| 2016/0225410 A1 | 8/2016 | Lee |
| 2016/0234345 A1 | 8/2016 | Roberts |
| 2016/0358603 A1 | 12/2016 | Azam |
| 2016/0366330 A1 | 12/2016 | Boliek |
| 2017/0006214 A1 | 1/2017 | Andreassen |
| 2018/0068198 A1 * | 3/2018 | Savvides .............. G06K 9/3233 |

(56) References Cited

U.S. PATENT DOCUMENTS

OTHER PUBLICATIONS

Schroff et al., "FaceNet: A Unified Embedding for Face Recognition and Clustering," IEEE Conference on Computer Vision and Pattern Recognition (CVPR), 2016, 10 pgs.
Parkhi et al., "Deep Face Recognition," Proceedings of the British Machine Vision, 2015, 12 pgs.
Iandola et al., "SqueezeNet: AlexNet-level accuracy with 50x fewer parameters and <0.5MB model size," arXiv:1602.07360, 2016, 9 pgs.
Ioffe et al., "Batch Normalization: Accelerating Deep Network Training by Reducing Internal Covariate Shift," arXiv:1502.03167, 2015, 11 pgs.
He et al., "Deep Residual Learning for Image Recognition," arXiv:1512.03385, 2015, 12 pgs.
Han et al., "Deep Compression: Compressing Deep Neural Networks with Pruning, Trained Quantization and Huffman Coding," International Conference on Learning Representations 2016, 14 pgs.
Ricker, "First Click: TomTom's Bandit camera beats GoPro with software" Mar. 9, 2016 URL: http://www.theverge.com/2016/3/9/11179298/tomtom-bandit-beats-gopro (6 pages).
PCT International Preliminary Report on Patentability for PCT/US2015/023680, dated Oct. 4, 2016, 10 pages.
PCT International Search Report for PCT/US15/23680 dated Aug. 3, 2015, 4 pages.
PCT International Search Report for PCT/US15/41624 dated Nov. 4, 2015, 5 pages.
PCT International Written Opinion for PCT/US2015/041624, dated Dec. 17, 2015, 7 Pages.
PCT International Search Report and Written Opinion for PCT/US2015/023680, dated Oct. 6, 2015, 13 pages.
FFmpeg, "Demuxing," Doxygen, Dec. 5, 2014, 15 Pages, [online] [retrieved on Jul. 13, 2015] Retrieved from the Internet <URL:https://www.ffmpeg.org/doxygen/2.3/group_lavf_encoding.html>.
PCT International Search Report and Written Opinion for PCT/US15/12086 dated Mar. 17, 2016, 20 pages.
FFmpeg, "Muxing," Doxygen, Jul. 20, 2014, 9 Pages, [online] [retrieved on Jul. 13, 2015] Retrieved from the internet <URL: https://www.ffmpeg.org/doxygen/2.3/structA VP a ck et. html>.
FFmpeg, "AVPacket Struct Reference," Doxygen, Jul. 20, 2014, 24 Pages, [online] [retrieved on Jul. 13, 2015] Retrieved from the internet <URL:https://www.ffmpeg.org/doxygen/2.5/group_lavf_decoding.html>.
Iandola et al., "SqueezeNet: AlexNet-level accuracy with 50x fewer parameters and <0.5MB model size", arXiv:1602.07360v3 [cs.CV] Apr. 6, 2016 (9 pgs.).
Yang et al., "Unsupervised Extraction of Video Highlights Via Robust Recurrent Auto-encoders" arXiv:1510.01442v1 [cs.CV] Oct. 6, 2015 (9 pgs).
Tran et al., "Learning Spatiotemporal Features with 3D Convolutional Networks", arXiv:1412.0767 [cs.CV] Dec. 2, 2014 (9 pgs).
Ernoult, Emeric, "How to Triple Your YouTube Video Views with Facebook", SocialMediaExaminer.com, Nov. 26, 2012, 16 pages.
PCT International Search Report and Written Opinion for PCT/US15/18538, dated Jun. 16, 2015, 26 pages.
PCT International Search Report for PCT/US17/16367 dated Apr. 14, 2017 (2 pages).
PCT International Search Reort for PCT/US15/18538 dated Jun. 16, 2015 (2 pages).

* cited by examiner

| Layer | Input Channels and Dimensions | Output Channels and Dimensions |
|---|---|---|
| input layer 401 | 3, 96, 96 | 3, 96, 96 |
| pre-norm layer A 402 | 3, 96, 96 | 3, 96, 96 |
| pre-padding layer 403 | 3, 96, 96 | 3, 102, 102 |
| pre-convolution layer 404 | 3, 102, 102 | 256, 48, 48 |
| pre-activation layer 405 | 256, 48, 48 | 256, 48, 48 |
| pre-norm layer B 406 | 256, 48, 48 | 256, 48, 48 |
| pre-downsample layer 407 | 256, 48, 48 | 256, 23, 23 |
| inter-A squeeze layer 411 | 256, 23, 23 | 32, 23, 23 |
| inter-A norm layer A 412 | 32, 23, 23 | 32, 23, 23 |
| inter-A padding layer 413 | 32, 23, 23 | 32, 25, 25 |
| inter-A expand layer A 414 | 32, 25, 25 | 128, 23, 23 |
| inter-A expand layer B 415 | 32, 23, 23 | 128, 23, 23 |
| inter-A concat layer 416 | 128, 23, 23<br>128, 23, 23 | 256, 23, 23 |
| inter-A norm layer B 417 | 256, 23, 23 | 256, 23, 23 |
| inter-A activation layer 418 | 256, 23, 23 | 256, 23, 23 |
| inter-A combine layer 419 | 256, 23, 23<br>256, 23, 23 | 256, 23, 23 |
| inter-B squeeze layer 421 | 256, 23, 23 | 32, 23, 23 |
| inter-B norm layer A 422 | 32, 23, 23 | 32, 23, 23 |
| inter-B padding layer 423 | 32, 23, 23 | 32, 25, 25 |
| inter-B expand layer A 424 | 32, 25, 25 | 128, 23, 23 |
| inter-B expand layer B 425 | 32, 23, 23 | 128, 23, 23 |
| inter-B concat layer 426 | 128, 23, 23<br>128, 23, 23 | 256, 23, 23 |
| inter-B norm layer B 427 | 256, 23, 23 | 256, 23, 23 |
| inter-B activation layer 428 | 256, 23, 23 | 256, 23, 23 |
| inter-B combine layer 429 | 256, 23, 23<br>256, 23, 23 | 256, 23, 23 |

FIG. 5A

| Layer | Input Channels and Dimensions | Output Channels and Dimensions |
|---|---|---|
| inter-C squeeze layer 431 | 256, 23, 23 | 32, 23, 23 |
| inter-C norm layer A 432 | 32, 23, 23 | 32, 23, 23 |
| inter-C padding layer 433 | 32, 23, 23 | 32, 25, 25 |
| inter-C expand layer A 434 | 32, 25, 25 | 128, 23, 23 |
| inter-C expand layer B 435 | 32, 23, 23 | 128, 23, 23 |
| inter-C concat layer 436 | 128, 23, 23<br>128, 23, 23 | 256, 23, 23 |
| inter-C norm layer B 437 | 256, 23, 23 | 256, 23, 23 |
| inter-C activation layer 438 | 256, 23, 23 | 256, 23, 23 |
| inter-C combine layer 439 | 256, 23, 23<br>256, 23, 23 | 256, 23, 23 |
| downsampling layer A 331 | 256, 23, 23 | 256, 11, 11 |
| inter-D squeeze layer 441 | 256, 11, 11 | 32, 11, 11 |
| inter-D norm layer A 442 | 32, 11, 11 | 32, 11, 11 |
| inter-D padding layer 443 | 32, 11, 11 | 32, 13, 13 |
| inter-D expand layer A 444 | 32, 13, 13 | 128, 11, 11 |
| inter-D expand layer B 445 | 32, 11, 11 | 128, 11, 11 |
| inter-D concat layer 446 | 128, 11, 11<br>128, 11, 11 | 256, 11, 11 |
| inter-D norm layer B 447 | 256, 11, 11 | 256, 11, 11 |
| inter-D activation layer 448 | 256, 11, 11 | 256, 11, 11 |
| inter-D combine layer 449 | 256, 11, 11<br>256, 11, 11 | 256, 11, 11 |
| inter-E squeeze layer 451 | 256, 11, 11 | 32, 11, 11 |
| inter-E norm layer A 452 | 32, 11, 11 | 32, 11, 11 |
| inter-E padding layer 453 | 32, 11, 11 | 32, 13, 13 |
| inter-E expand layer A 454 | 32, 13, 13 | 128, 11, 11 |
| inter-E expand layer B 455 | 32, 11, 11 | 128, 11, 11 |
| inter-E concat layer 456 | 128, 11, 11<br>128, 11, 11 | 256, 11, 11 |
| inter-E norm layer B 457 | 256, 11, 11 | 256, 11, 11 |
| inter-E activation layer 458 | 256, 11, 11 | 256, 11, 11 |
| inter-E combine layer 459 | 256, 11, 11<br>256, 11, 11 | 256, 11, 11 |

FIG. 5B

| Layer | Input Channels and Dimensions | Output Channels and Dimensions |
|---|---|---|
| inter-F squeeze layer 461 | 256, 11, 11 | 32, 11, 11 |
| inter-F norm layer A 462 | 32, 11, 11 | 32, 11, 11 |
| inter-F padding layer 463 | 32, 11, 11 | 32, 13, 13 |
| inter-F expand layer A 464 | 32, 13, 13 | 128, 11, 11 |
| inter-F expand layer B 465 | 32, 11, 11 | 128, 11, 11 |
| inter-F concat layer 466 | 128, 11, 11<br>128, 11, 11 | 256, 11, 11 |
| inter-F norm layer B 467 | 256, 11, 11 | 256, 11, 11 |
| inter-F activation layer 468 | 256, 11, 11 | 256, 11, 11 |
| inter-F combine layer 469 | 256, 11, 11<br>256, 11, 11 | 256, 11, 11 |
| inter-G squeeze layer 471 | 256, 11, 11 | 32, 11, 11 |
| inter-G norm layer A 472 | 32, 11, 11 | 32, 11, 11 |
| inter-G padding layer 473 | 32, 11, 11 | 32, 13, 13 |
| inter-G expand layer A 474 | 32, 13, 13 | 128, 11, 11 |
| inter-G expand layer B 475 | 32, 11, 11 | 128, 11, 11 |
| inter-G concat layer 476 | 128, 11, 11<br>128, 11, 11 | 256, 11, 11 |
| inter-G norm layer B 477 | 256, 11, 11 | 256, 11, 11 |
| inter-G activation layer 478 | 256, 11, 11 | 256, 11, 11 |
| inter-G combine layer 479 | 256, 11, 11<br>256, 11, 11 | 256, 11, 11 |
| downsampling layer B 332 | 256, 11, 11 | 256, 5, 5 |
| inter-H squeeze layer 481 | 256, 5, 5 | 32, 5, 5 |
| inter-H norm layer A 482 | 32, 5, 5 | 32, 5, 5 |
| inter-H padding layer 483 | 32, 5, 5 | 32, 7, 7 |
| inter-H expand layer A 484 | 32, 7, 7 | 128, 5, 5 |
| inter-H expand layer B 485 | 32, 5, 5 | 128, 5, 5 |
| inter-H concat layer 486 | 128, 5, 5<br>128, 5, 5 | 256, 5, 5 |
| inter-H norm layer B 487 | 256, 5, 5 | 256, 5, 5 |
| inter-H activation layer 488 | 256, 5, 5 | 256, 5, 5 |
| inter-H combine layer 489 | 256, 5, 5<br>256, 5, 5 | 256, 5, 5 |

FIG. 5C

| Layer | Input Channels and Dimensions | Output Channels and Dimensions |
|---|---|---|
| final drop layer 491 | 256, 5, 5 | 256, 5, 5 |
| final convolution layer 492 | 256, 5, 5 | 128, 5, 5 |
| final activation layer 493 | 128, 5, 5 | 128, 5, 5 |
| final norm layer A 494 | 128, 5, 5 | 128, 5, 5 |
| final downsample layer 495 | 128, 5, 5 | 128, 1, 1 |
| final flatten layer 496 | 128, 1, 1 | 128 |
| final norm layer B 497 | 128 | 128 |

FIG. 5D

|  | OpenFace | Compact Convolutional Neural Network |
|---|---|---|
| Parameters | 3,700,000 | 470,000 |
| Size on disk | 14.8 MB | 294 kB |
| LFW accuracy | 92.92% | 92.30% |

FIG. 6

SYSTEMS AND METHODS FOR COMPACT CONVOLUTIONAL NEURAL NETWORKS

FIELD

This disclosure relates to systems and methods for compact convolutional neural networks.

BACKGROUND

Convolutional neural networks may be used to process images. For example, convolutional neural networks may be used for image recognition and/or image classification. Convolutional neural networks may include filters that are self-optimized through learning. Convolutional neural networks may automatically learn filters which may be used for image processing by successively convolving an input image with learned filters to produce a hierarchy of feature maps. Sizes of convolutional neural networks may make it impracticable to run convolutional neural networks on low resource/processing devices, such as mobile devices.

SUMMARY

This disclosure relates to compact convolutional neural networks. A compact convolutional neural network may include a preliminary layer group, one or more intermediate layer groups, a final layer group, and/or other layers/layer groups. The preliminary layer group may include an input layer, a first preliminary normalization layer, a preliminary padding layer, a preliminary convolution layer, a preliminary activation layer, a second preliminary normalization layer, and a preliminary downsampling layer. One or more intermediate layer groups may include an intermediate squeeze layer, a first intermediate normalization layer, an intermediate padding layer, a first intermediate expand layer, a second intermediate expand layer, an intermediate concatenation layer, a second intermediate normalization layer, an intermediate activation layer, and an intermediate combination layer. The final layer group may include a final dropout layer, a final convolution layer, a final activation layer, a first final normalization layer, a final downsampling layer, a final flatten layer, and a second final normalization layer.

A compact convolutional neural network system may include one or more physical processors, and/or other components. The one or more physical processors may be configured by machine-readable instructions. Executing the machine-readable instructions may cause the one or more physical processors to facilitate uses of a compact convolutional neural network. The machine-readable instructions may include one or more computer program components. The computer program components may include one or more of a preliminary layer group component, an intermediate layer group component, a downsampling layer component, a final layer group component, and/or other computer program components.

The compact convolutional neural network may be used to process images. In some implementations, the compact convolutional neural network may be used to cluster faces within the images. In some implementations, the compact convolutional neural network may be run on a mobile device. The compact convolutional neural network may include one or more sequences of layers. The compact convolutional neural network may include one or more of a preliminary layer group, an intermediate layer group, a final layer group, downsampling layers, and/or other layers/layer groups.

The preliminary layer group component may be configured to effectuate operation of a preliminary layer group and/or other layers/layer groups. The preliminary layer group may include one or more of an input layer, a first preliminary normalization layer, a preliminary padding layer, a preliminary convolution layer, a preliminary activation layer, a second preliminary normalization layer, a preliminary downsampling layer, and/or other layers. The input layer may access an image map. The first preliminary normalization layer may normalize the image map. The preliminary padding layer may increase the dimensionality of the image map. The preliminary convolution layer may convolve the image map to produce a first set of feature maps. The preliminary activation layer may apply a first activating function to the first set of feature maps. The second preliminary normalization layer may normalize the first set of feature maps. The preliminary downsampling layer may downsample the first set of feature maps. In some implementations, the first set of feature maps may be downsampled using a max pooling and/or other downsampling methods.

The intermediate layer group component may be configured to effectuate operation of one or more intermediate layer groups and/or other layers/layer groups. One or more intermediate layer groups may include one or more of an intermediate squeeze layer, a first intermediate normalization layer, an intermediate padding layer, a first intermediate expand layer, a second intermediate expand layer, an intermediate concatenation layer, a second intermediate normalization layer, an intermediate activation layer, an intermediate combination layer, and/or other layers. In some implementations, the number of filters within the compact convolutional neural network may be set such that the individual intermediate layer groups are characterized by a same number of input channels and output channels. In some implementations, the same number of input channels and output channels is equal to 256. In some implementations, precisions for one or more filters within the compact convolutional neural network may be reduced from 32 bits to 5 bits for storage.

In some implementations, one or more intermediate layer groups may include a first intermediate layer group, a second intermediate layer group, a third intermediate layer group, a fourth intermediate layer group, a fifth intermediate layer group, a sixth intermediate layer group, a seventh intermediate layer group, and an eighth intermediate layer group, and/or other layers/layer groups. In some implementations, one or more intermediate layer groups may include a first intermediate layer group, a second intermediate layer group, a third intermediate layer group, a fourth intermediate layer group, a fifth intermediate layer group, a sixth intermediate layer group, and a seventh intermediate layer group, and/or other layers/layer groups.

The intermediate squeeze layer may receive a first output from a layer preceding the individual intermediate layer group. The intermediate squeeze layer may convolve the first output to reduce a number of channels of the first output. The first intermediate normalization layer may normalize the first output. The intermediate padding layer may increase the dimensionality of the first output. The first intermediate expand layer may convolve the first output to produce a second set of feature maps. The second intermediate expand layer may convolve the first output to produce a third set of feature maps.

The intermediate concatenation layer may concatenate the second set of feature maps and the third set of feature maps to produce a set of concatenated feature maps. The second intermediate normalization layer may normalize the set of concatenated feature maps. The intermediate activation layer may apply a second activating function to the set of concatenated feature maps. The intermediate combination layer may combines the set of concatenated feature maps and the first output. One or more intermediate layer groups may not include an activation layer between the first intermediate normalization layer and the intermediate padding layer that applies an activating function to the first output.

The downsampling layer component may be configured to effectuate operation of one or more downsampling layers and/or other layers/layer groups. One or more downsampling layers may include one or more downsampling layers between two intermediate layer groups, one or more downsampling layers between an intermediate layer group and a final layer group, and/or other layers.

A first downsampling layer may be located between the third intermediate layer group and the fourth intermediate layer group. The first downsampling layer may receive a third output from the third intermediate layer group and downsample the third output. In some implementations, the third output may be downsampled using a max pooling and/or other downsampling methods.

In some implementations, a second downsampling layer may be located between the seventh intermediate layer group and the eighth intermediate layer group. In some implementations, the second downsampling layer may be located between the seventh intermediate layer group and the final layer group. The second downsampling layer may receive a fourth output from the seventh intermediate layer group and downsample the fourth output. In some implementations, the fourth output may be downsampled using a max pooling and/or other downsampling methods.

The final layer group component may be configured to effectuate operation of a final layer group and/or other layers/layer groups. The final layer group may include one or more of a final dropout layer, a final convolution layer, a final activation layer, a first final normalization layer, a final downsampling layer, a final flatten layer, a second final normalization layer, and/or other layers.

The final dropout layer may receive a second output from a layer preceding the final layer group. The final dropout layer may reduce an overfitting from the second output. The final convolution layer may convolve the second output to produce a fourth set of feature maps. The final activation layer may apply a third activating function to the fourth set of feature maps. The first final normalization layer may normalize the fourth set of feature maps. The final downsampling layer may downsample the fourth set of feature maps. In some implementations, the fourth set of feature maps may be downsampled using an average pooling and/or other downsampling methods. The final flatten layer may convert the fourth set of feature maps into a feature vector. The second final normalization layer may normalize the feature vector.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIGS. 5A-5D illustrate exemplary input and output channels and dimensions for layers shown in FIGS. 4A-4I.

FIG. 6 summarizes exemplary improvements provided by compact convolutional neural network structure of FIG. 3.

DETAILED DESCRIPTION

Figure 1:
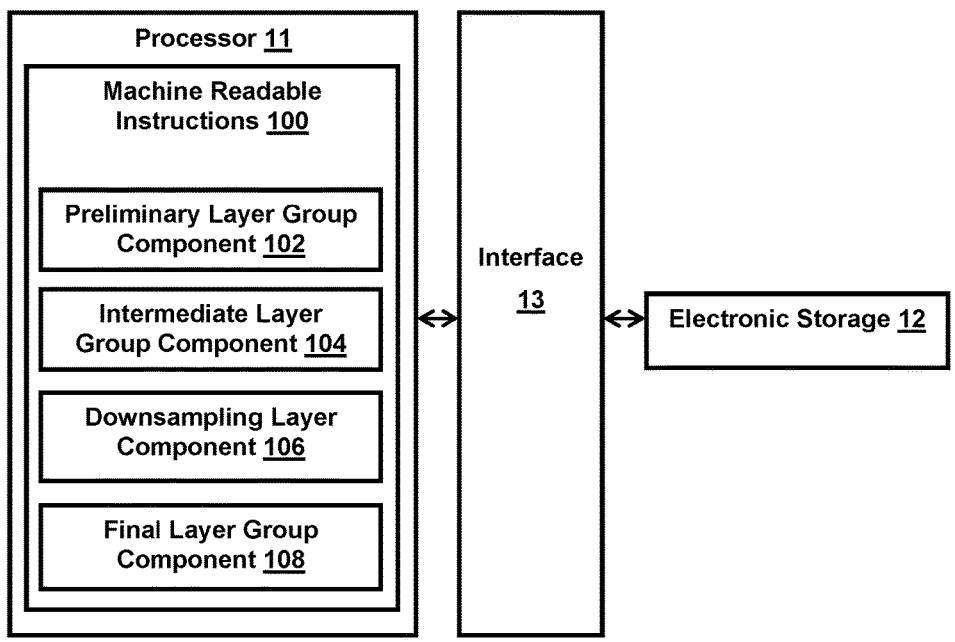
FIG. 1 illustrates a compact convolutional neural network system.
Figure 2A:
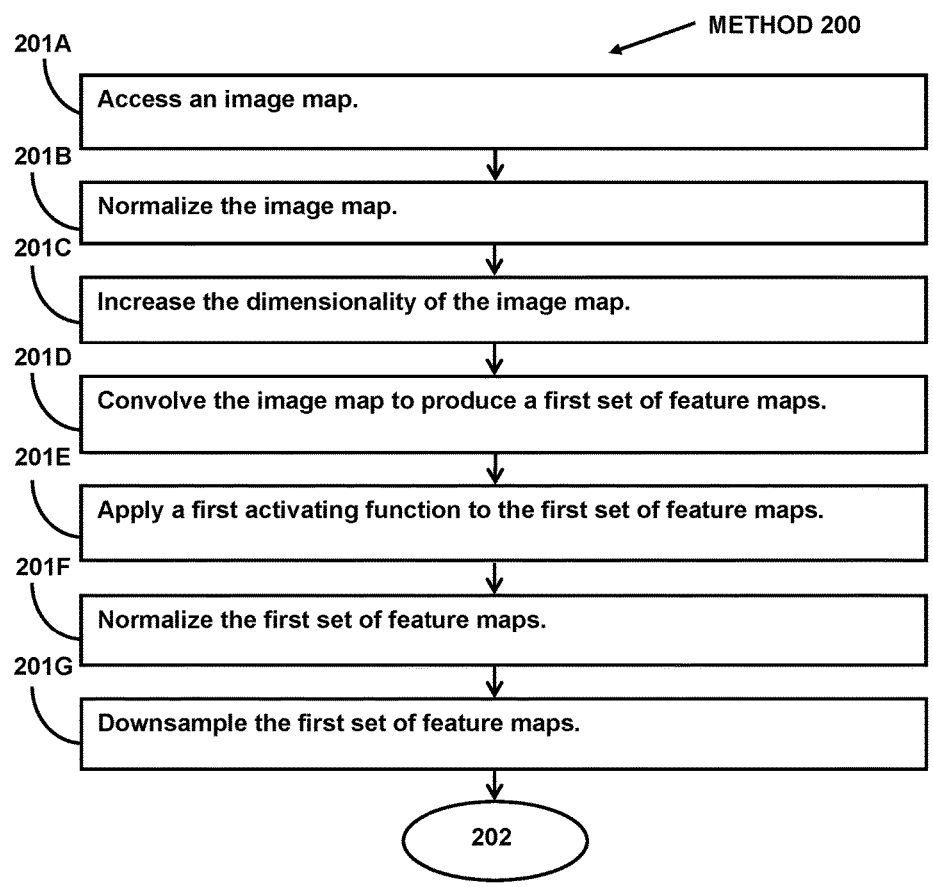
FIGS. 2A-2D illustrate a method for using a compact convolutional neural network system.
Figure 2B:
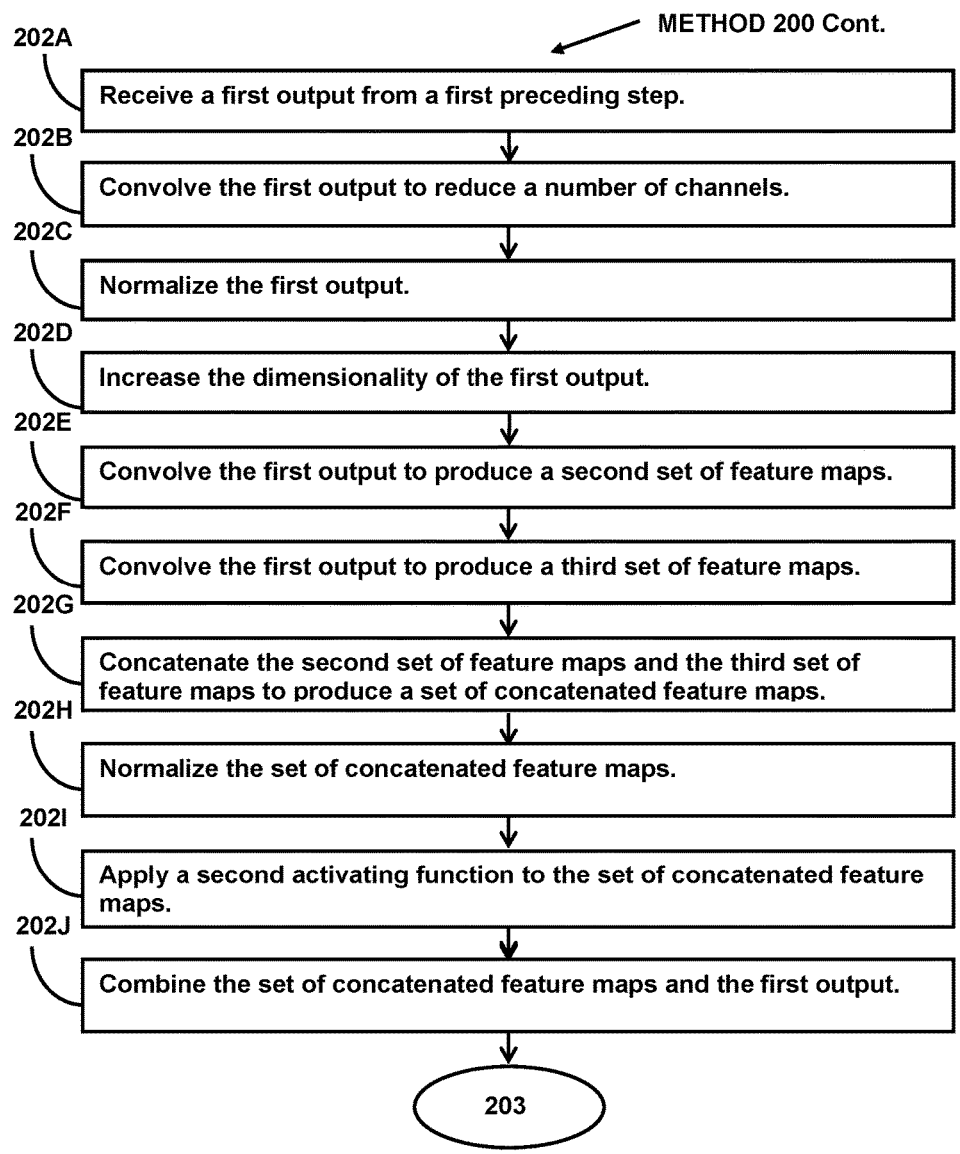
Figure 2C:
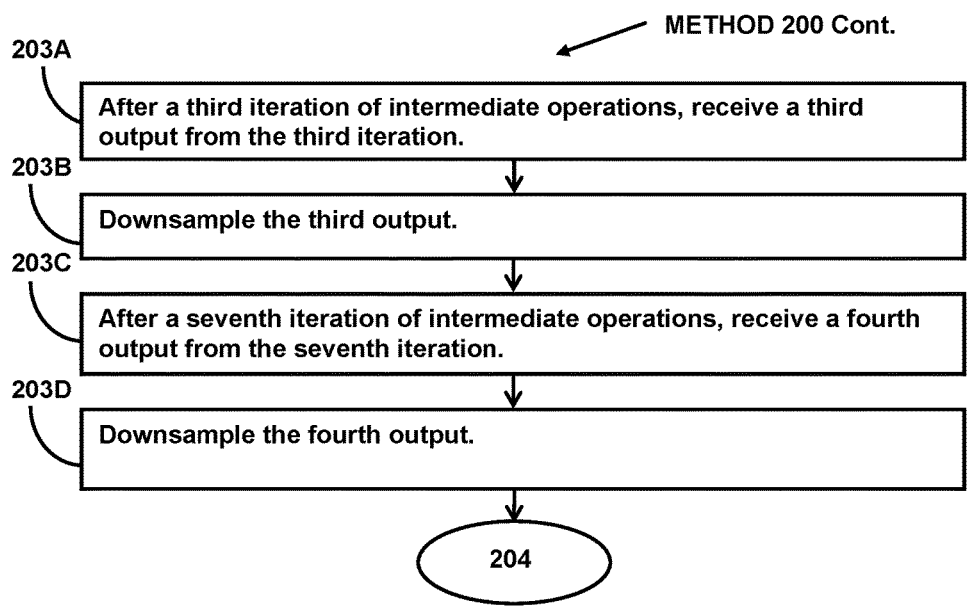
Figure 2D:
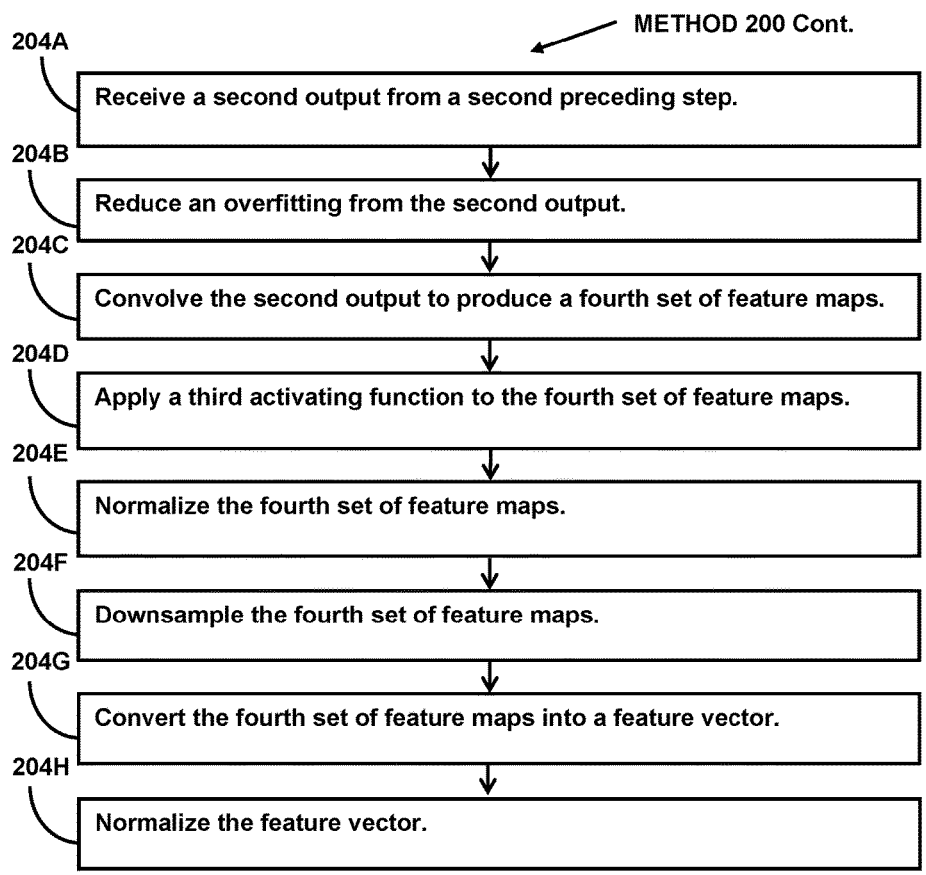

FIG. 1 illustrates system 10 for compact convolutional neural networks. System 10 may include one or more of processor 11, electronic storage 12, interface 13 (e.g., bus, wireless interface, etc.), and/or other components. A compact convolutional neural network may include a preliminary layer group, one or more intermediate layer groups, a final layer group, and/or other layers/layer groups. The preliminary layer group may include an input layer, a first preliminary normalization layer, a preliminary padding layer, a preliminary convolution layer, a preliminary activation layer, a second preliminary normalization layer, and a preliminary downsampling layer. One or more intermediate layer groups may include an intermediate squeeze layer, a first intermediate normalization layer, an intermediate padding layer, a first intermediate expand layer, a second intermediate expand layer, an intermediate concatenation layer, a second intermediate normalization layer, an intermediate activation layer, and an intermediate combination layer. The final layer group may include a final dropout layer, a final convolution layer, a final activation layer, a first final normalization layer, a final downsampling layer, a final flatten layer, and a second final normalization layer.

Electronic storage 12 may include electronic storage medium that electronically stores information. Electronic storage 12 may store software algorithms, information determined by processor 11, information received remotely, and/or other information that enables system 10 to function properly. For example, electronic storage 12 may store information relating to images, image maps, clustering faces within the images, layers, layer groups, filters, training compact convolutional neural networks, and/or other information.

Processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured to execute one or more machine readable instructions 100 to facilitate uses of compact convolutional neural networks. Machine-readable instructions 100 may include one or more computer program components. Machine readable instructions 100 may include one or more of preliminary layer group component 102, intermediate layer group component 104, downsampling layer component 106, final layer group component 108, and/or other computer program components.

The compact convolutional neural network may be used to process images. In some implementations, the compact convolutional neural network may be used to cluster faces within images. For example, the convolutional neural network may receive as input one or more images containing faces. The compact convolutional neural network may include filters that are self-optimized through learning for classification of faces within images. Small sizes of the compact convolutional neural network may allow for the compact convolutional neural network to run on low resource/processing devices, such as mobile devices.

Figure 3:
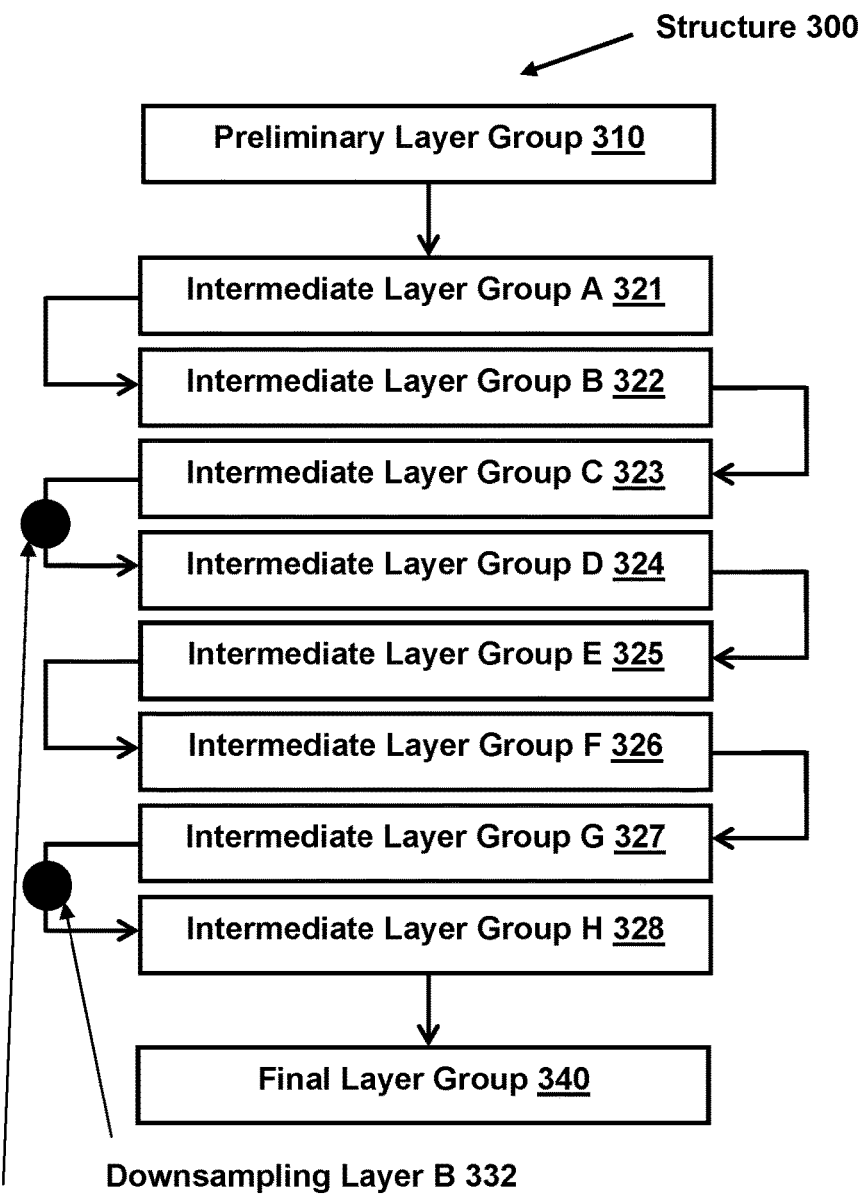
FIG. 3 illustrates an exemplary compact convolutional neural network structure.
Figure 4A:
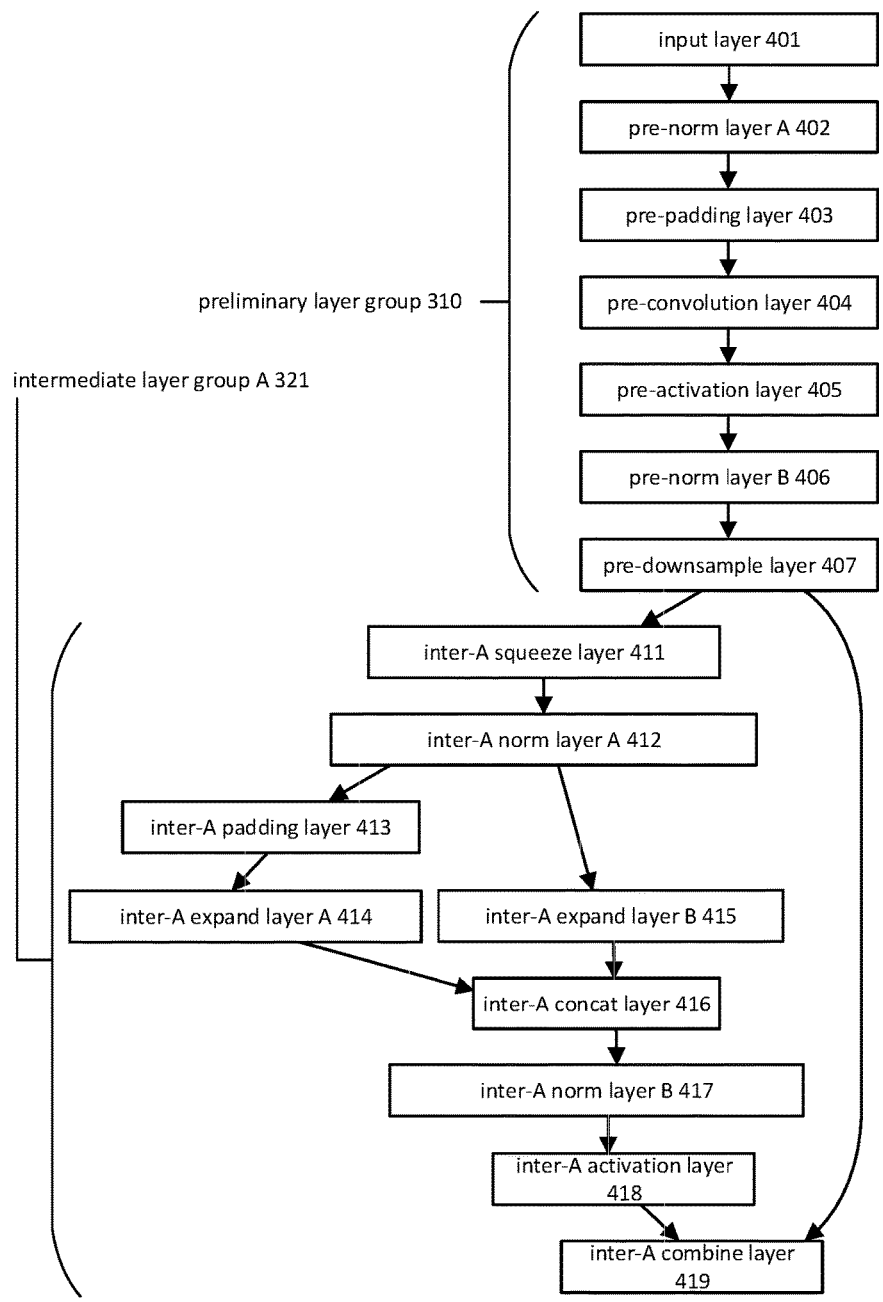
FIGS. 4A-4I illustrate exemplary layers within compact convolutional neural network structure of FIG. 3.
Figure 4B:
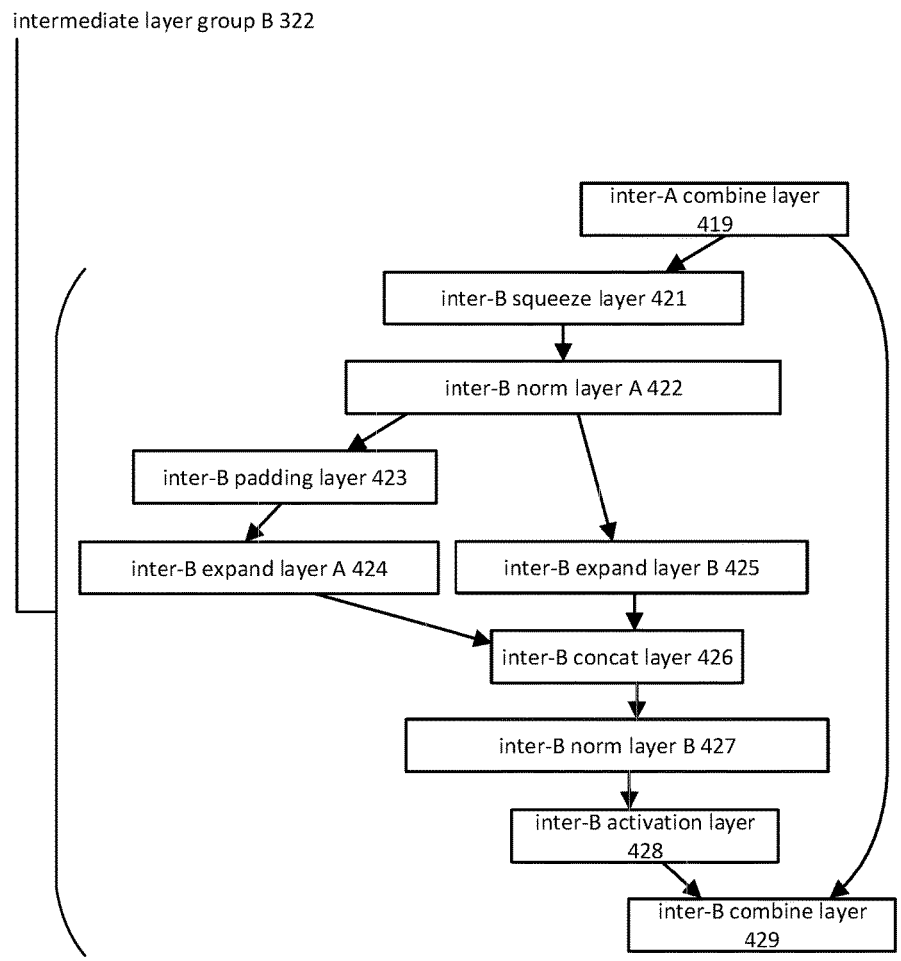
Figure 4C:
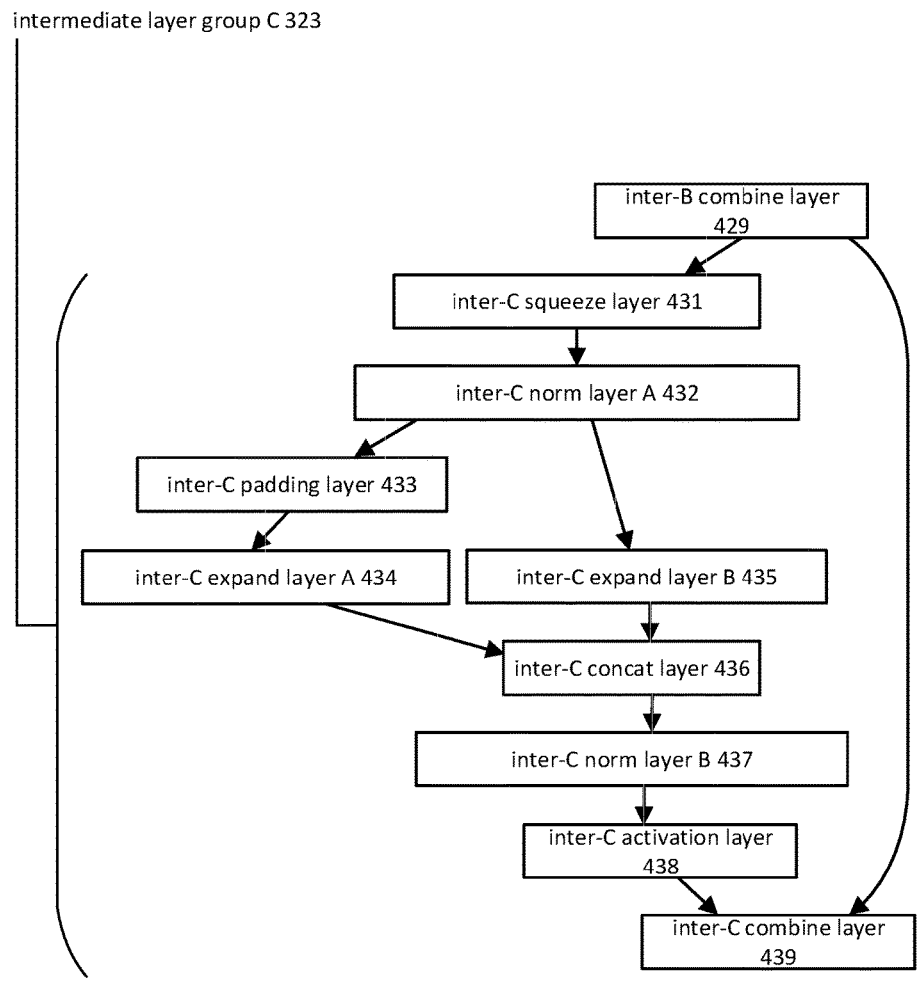
Figure 4D:
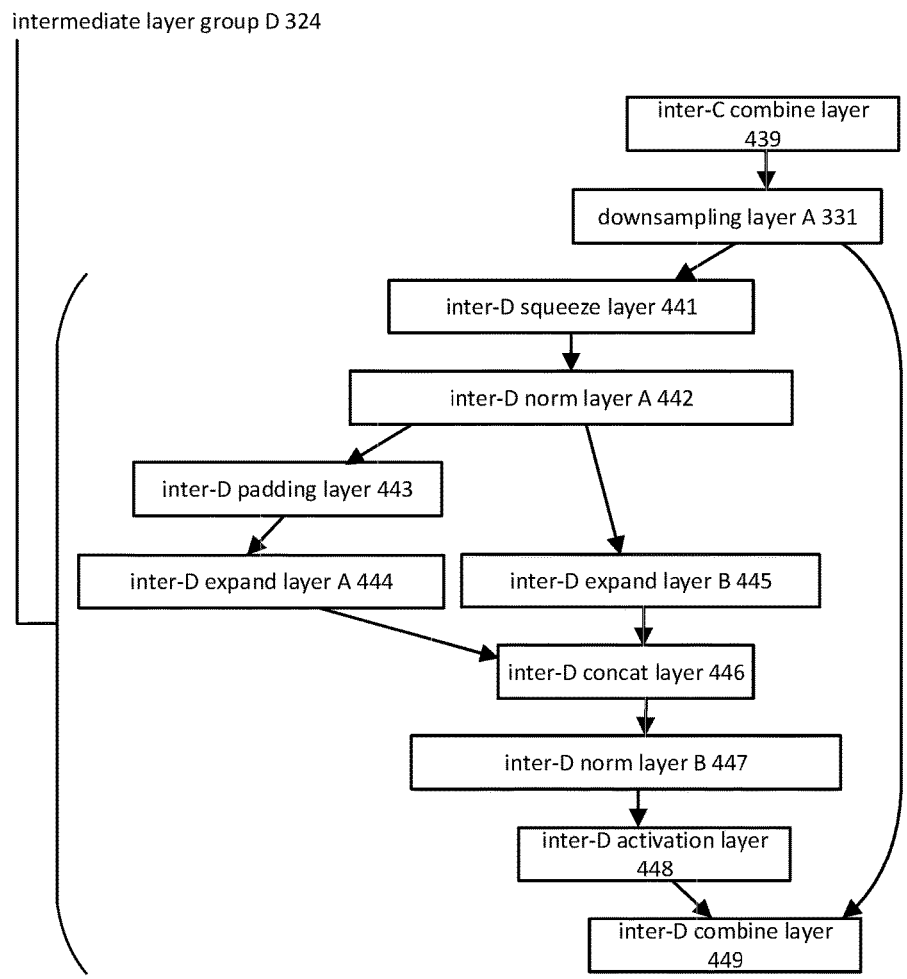
Figure 4E:
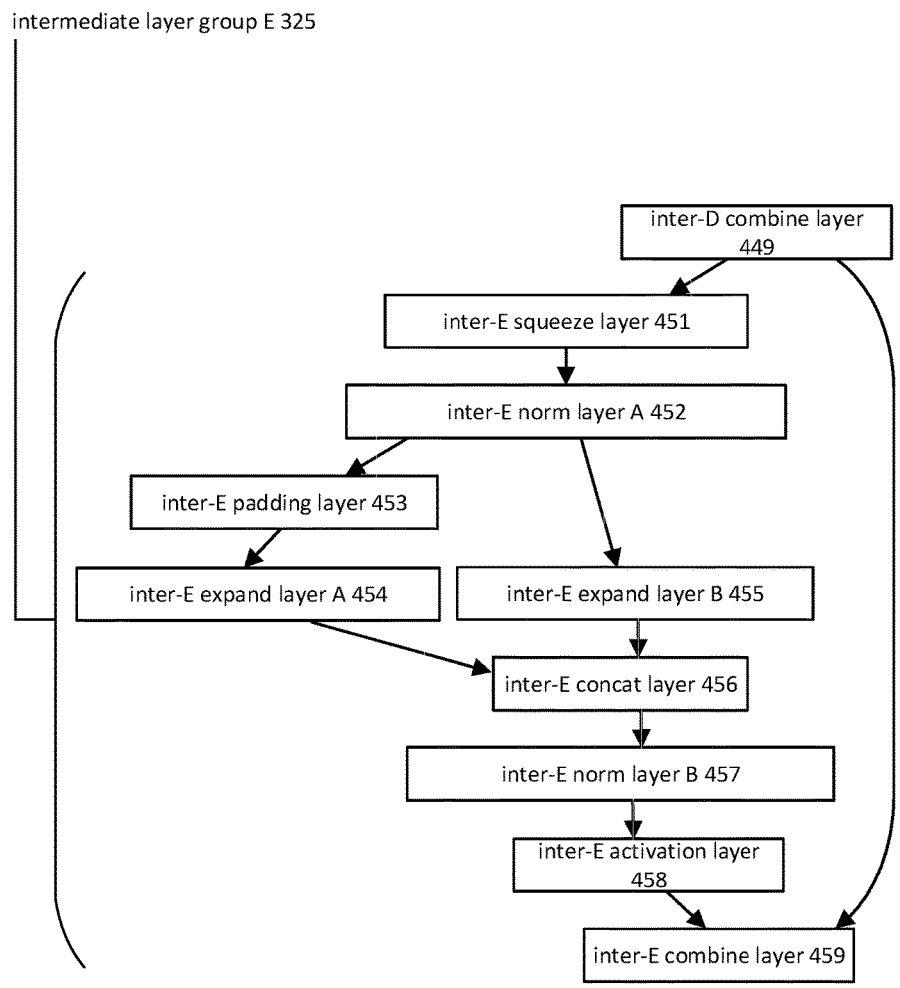
Figure 4F:
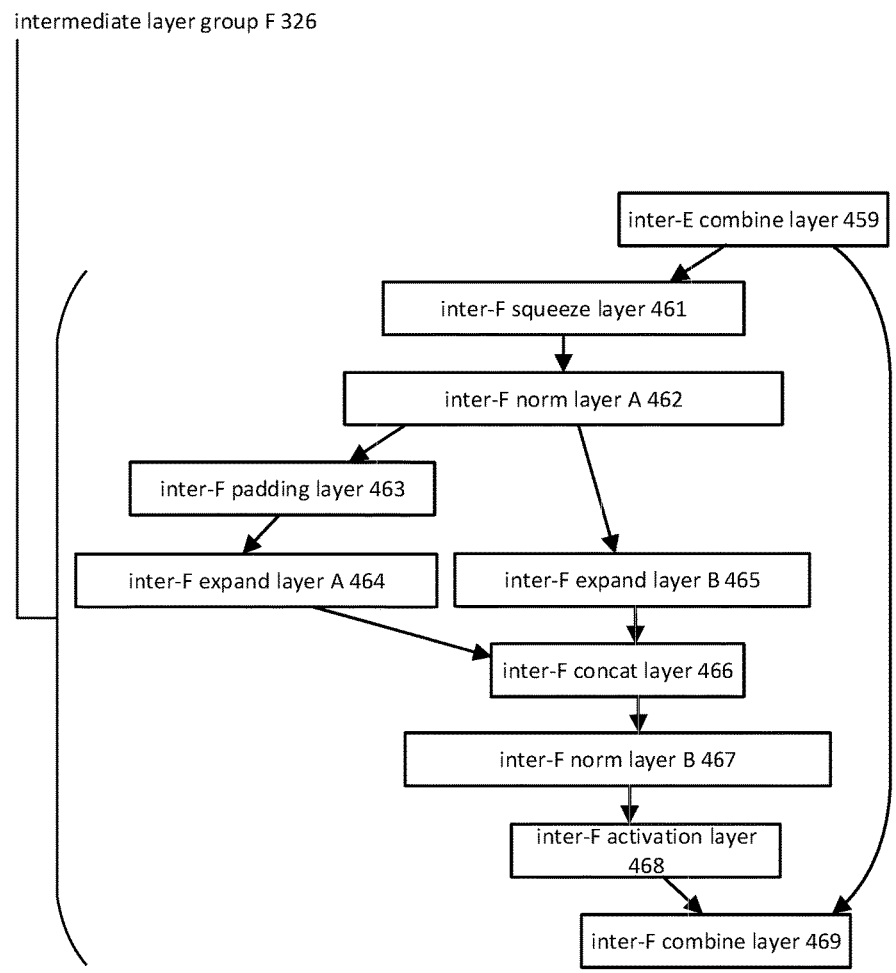
Figure 4G:
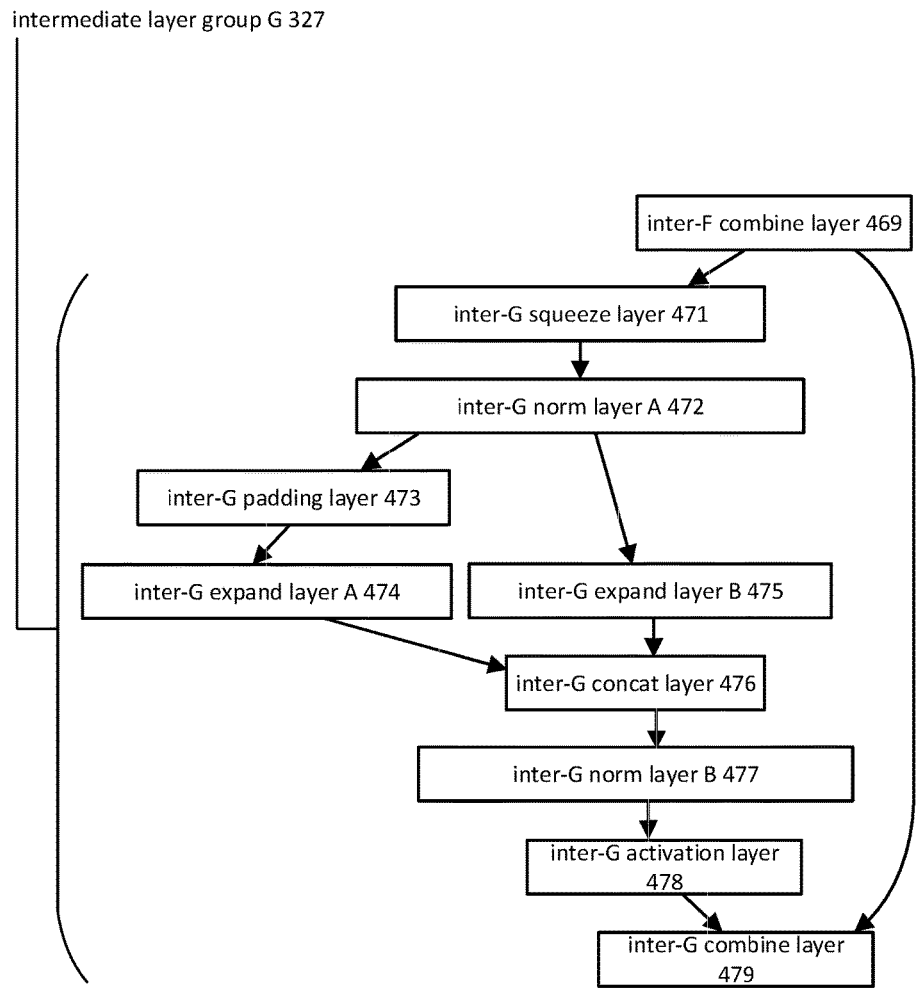
Figure 4H:
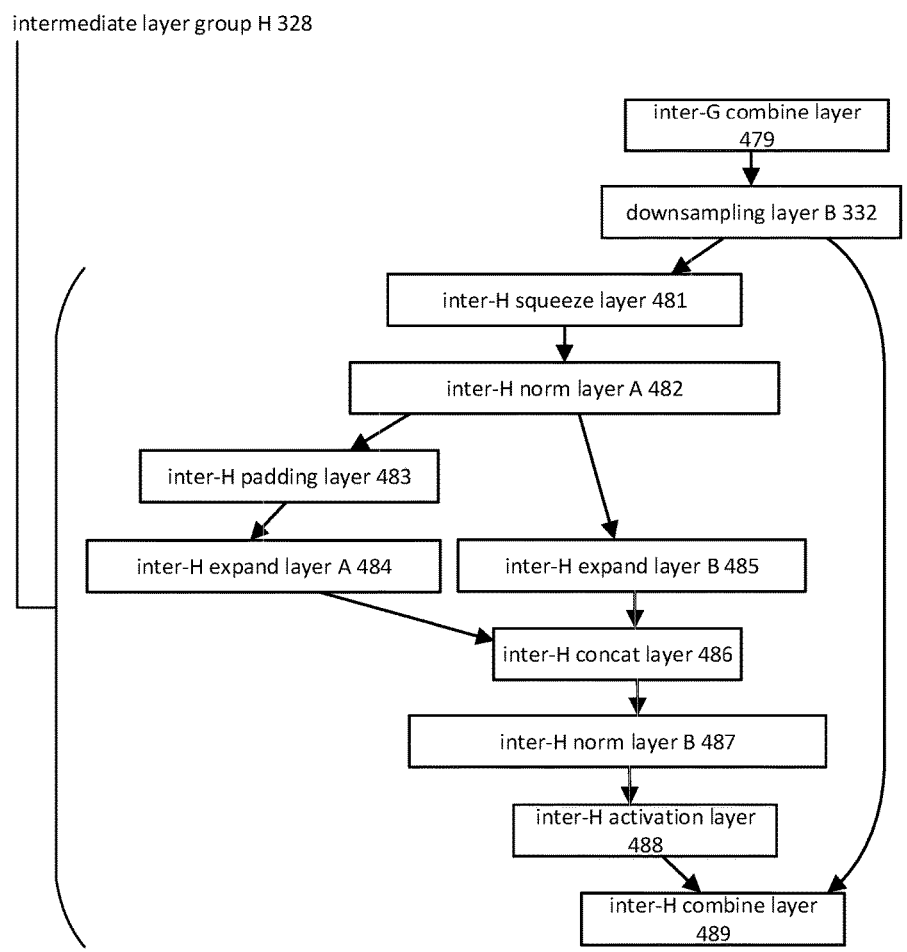
Figure 4I:
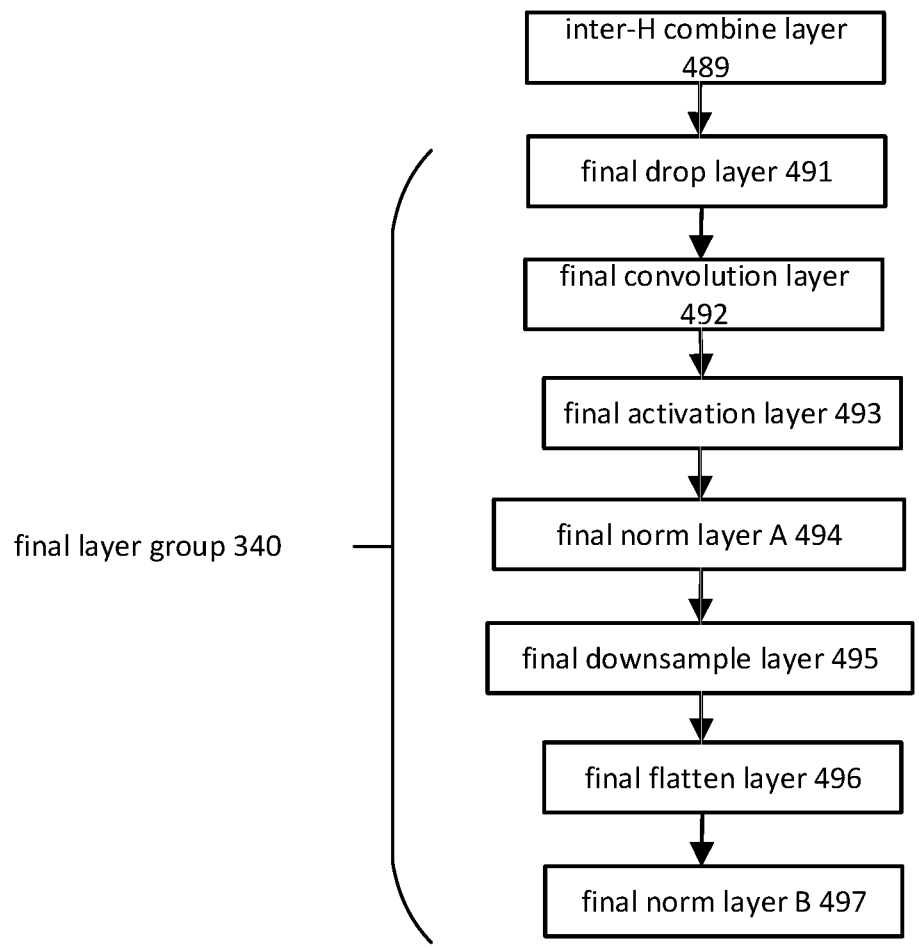

The compact convolutional neural network may include one or more sequences of layers and/or layer groups. Individual layers/layer groups may perform one or more functions, receiving an input and producing an output. The compact convolutional neural network may include one or more of a preliminary layer group, an intermediate layer group, a final layer group, downsampling layers, and/or other layers/layer groups. FIG. 3 illustrates an exemplary structure 300 for a compact convolutional neural network. Structure 300 may include preliminary layer group 310, intermediate layer group A 321, intermediate layer group B 322, intermediate layer group C 323, intermediate layer group D 324, intermediate layer group E 325, intermediate layer group F 326, intermediate layer group G 327, intermediate layer group H 328, final layer group 340, downsampling layer A 331, downsampling layer B 332, and/or other layers/layer groups.

FIGS. 4A-4I illustrate exemplary sequence of layers within structure 300 of FIG. 3. Sequence of layers within structure 300 may include one or more layers between the depicted layers. For example, sequence of layers within structure 300 may include one or more additional layers (not shown) between the depicted layers. For example, structure 300 may include one or more additional layers between layers of a layer group (e.g., preliminary layer group, intermediate layer group, final layer group, etc.) and/or one or more additional layers between layer groups.

Preliminary layer group component 102 may be configured to effectuate operation of preliminary layer group 310 and/or other layers/layer groups. Preliminary layer group 310 may include one or more of an input layer, a first preliminary normalization layer, a preliminary padding layer, a preliminary convolution layer, a preliminary activation layer, a second preliminary normalization layer, a preliminary downsampling layer, and/or other layers. For example, preliminary layer group 310 may include input layer 401, pre-norm layer A 402, pre-padding layer 403, pre-convolution layer 404, pre-activation layer 405, pre-norm layer B 406, pre-downsample layer 407, and/or other layers.

Input layer 401 may access one or more image maps and/or other information as input to the compact convolutional neural network. Input layer 401 may access one or more image maps and/or other information stored in electronic storage 12 and/or in other locations. Accessing multiple image maps at the same time may allow for batch training of the compact convolutional neural network. Batch training may allow for faster training and/or prediction by the compact convolutional neural network.

An image map may be characterized by a number of channels (e.g., color channels, number of feature maps) and dimensions (e.g., height and width). For example, input layer 401 may receive as input to the compact convolutional neural network one or more image maps characterized by three channels of color, a height of 96 pixels, and a width of 96 pixels. The number of channels and/or dimensions of an input into the compact convolutional neural network may change as the input is processed through layers/layer groups. Exemplary numbers of channels and dimensions for inputs to and outputs of individual layers of structure 300 are shown in FIGS. 5A-5D.

Pre-norm layer A 402 may normalize one or more image maps accessed by input layer 401. Pre-norm layer A 402 may perform normalization using one or more batch normalizing transforms and/or other transforms. Pre-norm layer A 402 may normalize scalar features of one or more image maps to produce one or more normalized image maps. The normalized image maps may be characterized by mean of zero and variance of one. Normalizing the image maps may increase the accuracy, training speed, and/or learning rate of the compact convolutional neural network.

Pre-padding layer 403 may increase the dimensionality of one or more image maps. Pre-padding layer 403 may increase the dimensionality using one or more zero-padding transforms and/or other transforms. Pre-padding layer 403 may increase the dimensionality one or more image maps normalized by pre-norm layer A 402 to produce one or more padded image maps. For example, pre-padding layer 403 may increase the dimensionality of one or more image maps (e.g., from 96 height and 96 width to 102 height and 102 width, etc.) by padding the borders of the image maps with zero values. Padding the borders of the image maps with zero values may allow for the compact convolutional neural network to control the dimensions of outputs of convolution operations (e.g., feature maps, etc.).

Pre-convolution layer 404 may convolve one or more image maps to produce one or more sets of feature maps. Pre-convolution layer 404 may convolve one or more image maps padded by pre-padding layer 403. Pre-convolution layer 404 may include one or more filters. One or more filters may slide over the image maps to output the sets of feature maps based on scalar products of the image maps and the filters. The number of feature maps outputted by pre-convolution layer 404 may be equal to the number of filters of pre-convolution layer 404. For example, pre-convolution layer 404 may include 256 filters and may output 256 feature maps (the output has 256 channels). Outputs from a convolution operation may have a smaller dimensionality than inputs to the convolution operation. The reduction in dimensionality may be based on the dimensionality and stride of filters of pre-convolution layer 404. For example, pre-convolution layer 404 may include filters with dimension of 7×7, and may convolve the maps using a stride of 2 (shifting filters by two pixels at each step). Pre-convolution layer 404 may receive image maps with dimensions of 102×102 and output feature maps with dimensions of 48×48.

Pre-activation layer 405 may apply an activating function to one or more sets of feature maps. Pre-activation layer 405 may apply an activating function to one more sets of feature maps from pre-convolution layer 404 to produce one or more sets of activated feature maps. An activating function may include a non-saturating activating function that increases the nonlinear properties of the decision function. In some implementations, pre-activation layer 405 may include a ReLU (Rectified Linear Unit) and/or other activating functions.

Pre-norm layer B 406 may normalize one or more sets of feature maps. Pre-norm layer B 406 may normalize one or more sets of activated feature maps from pre-activation layer 405 to produce one or more normalized sets of activated feature maps. Pre-norm layer B 406 may perform normalization using one or more batch normalizing transforms and/or other transforms.

Pre-downsample layer 407 may downsample one or more sets of feature maps. Pre-downsample layer 407 may downsample one or more normalized sets of activated feature maps from pre-norm layer B 406 to produce one or more downsampled sets of activated feature maps. Pre-downsample layer 407 may perform downsampling using a max pooling and/or other downsampling methods. Downsampling feature maps may reduce the dimensionality of the feature maps. The reduction in dimensionality may be based on the dimensionality and stride of a filter of pre-downsample layer 407. For example, pre-downsample layer 407 may include a filter with dimension of 3×3, and may downsample using a stride of 2 (shifting filters by two pixels at each step). Pre-downsample layer 407 may receive feature maps with dimensions of 48×48 and output feature maps with dimensions of 23×23.

Intermediate layer group component 104 may be configured to effectuate operation of one or more intermediate layer groups and/or other layers/layer groups. One or more intermediate layer groups may include one or more of an intermediate squeeze layer, a first intermediate normalization layer, an intermediate padding layer, a first intermediate expand layer, a second intermediate expand layer, an intermediate concatenation layer, a second intermediate normalization layer, an intermediate activation layer, an intermediate combination layer, and/or other layers. For example, intermediate layer group A 321 may include inter-A squeeze layer 411, inter-A norm layer A 412, inter-A padding layer 413, inter-A expand layer A 414, inter-A expand layer B 415, inter-A concat layer 416, inter-A norm layer B 417, inter-A activation layer 418, inter-A combine layer 419, and/or other layers.

In some implementations, the number of filters within the compact convolutional neural network may be set such that the individual intermediate layer groups are characterized by a same number of input channels and output channels. For example, individual intermediate layer groups may receive input with 256 channels and produce output with 256 channels. Equalizing the number of channels between inputs and outputs to intermediate layer groups may allow for greater numbers of intermediate combination layers to be placed within the compact convolutional neural network and reduce the number of parameters within the compact convolutional neural network with minor losses in the accuracy of the compact convolutional neural network.

An intermediate squeeze layer may receive one or more outputs from a layer preceding the individual intermediate layer group. For example, inter-A squeeze layer 411 may receive one or more outputs from the layer preceding intermediate layer group A 321 (e.g., pre-downsample layer 407). Intermediate squeeze layers may include thirty-two 1×1 squeeze filters and convolve the received output using a stride of 1. Intermediate squeeze layers may convolve the received outputs to reduce the number of channels of the received output and produce reduced outputs. For example, inter-A squeeze layer 411 may receive the output of pre-downsample layer 407 and reduce the number of channels from 256 to 32.

First intermediate normalization layer may normalize one or more outputs from the layer preceding the individual intermediate layer group. For example, inter-A norm layer A 412 may normalize one or more reduced outputs from inter-A squeeze layer 411 to produce one or more normalized outputs. Inter-A norm layer A 412 may perform normalization using one or more batch normalizing transforms and/or other transforms.

An intermediate padding layer may increase the dimensionality of one or more outputs from the layer preceding the individual intermediate layer group. For example, inter-A padding layer 413 may increase the dimensionality of one or more normalized outputs from inter-A norm layer 412 to produce one or more padded outputs. Inter-A padding layer 413 may increase the dimensionality of one or more normalized outputs from 23×23 to 25×25 by padding the borders of the normalized outputs with zero values.

First intermediate expand layer may convolve one or more outputs from the layer preceding the individual intermediate layer group to produce one or more sets of feature maps. For example, inter-A expand layer A 414 may convolve one or more padded outputs from inter-A padding layer 413 to produce one or more sets of feature maps. Inter-A expand layer A 414 may include a hundred and twenty-eight 3×3 expand filters and convolve the padded outputs using a stride of 1. Inter-A expand layer A 414 may convolve padded outputs having 32 channels and dimensions of 25×25 and produce one or more sets of feature maps having 128 channels and dimensions of 23×23. Inter-A expand layer A 414 may represent one of the main computing layers of the compact convolutional neural network. Inter-A expand layer A 414 may provide for feature detection within images processed by the compact convolutional neural network.

Second intermediate expand layer may convolve one or more outputs from the layer preceding the individual intermediate layer group to produce one or more sets of feature maps. For example, inter-A expand layer B 415 may convolve one or more normalized outputs from inter-A norm layer A 412 to produce one or more sets of feature maps. Inter-A expand layer B 415 may include a hundred and twenty-eight 1×1 expand filters and convolve the normalized outputs using a stride of 1. Inter-A expand layer B 415 may convolve normalized outputs having 32 channels and dimensions of 23×23 and produce one or more sets of feature maps having 128 channels and dimensions of 23×23. Inter-A expand layer B 415 may represent one of the main computing layers of the compact convolutional neural network. Inter-A expand layer B 415 may provide for feature detection within images processed by the compact convolutional neural network.

An intermediate concatenation layer may concatenate two or more sets of feature maps from different layers to produce one or more sets of concatenated feature maps. For example, inter-A concat layer 416 may concatenate one or more sets of feature maps from inter-A expand layer A 414 and one or more sets of feature maps from inter-A expand layer B 415. Individual sets of feature maps from inter-A expand layer A 414 and inter-A expand layer B 415 may have the same numbers of channels and dimensions: 128 channels and dimensions of 23×23. The produced set of concatenated feature maps may have 256 channels and dimensions of 23×23.

Second intermediate normalization layer may normalize one or more sets of concatenated feature maps. For example, inter-A norm layer B 417 may normalized one or more sets of concatenated feature maps from inter-A concat layer 416 to produce one or more normalized sets of concatenated feature maps. Inter-A norm layer B 417 may perform normalization using one or more batch normalizing transforms and/or other transforms.

An intermediate activation layer may apply an activating function to one or more sets of concatenated feature maps. For example, inter-A activation layer 418 may apply an activating function to one or more normalized sets of concatenated feature maps from inter-A norm layer B 417 to produce one or more sets of activated feature maps. In some implementations, inter-A activation layer 418 may include a ReLU (Rectified Linear Unit), and/or other activating functions.

An intermediate combination layer may combines one or more sets of concatenated feature maps and one or more outputs from the layer preceding the individual intermediate layer group. For example, inter-A combine layer 419 may combine one or more sets of activated feature maps from inter-A activation layer 418 and one or more outputs from the layer preceding intermediate layer group A 321 (e.g., pre-downsample layer 407) to produce one or more sets of combined feature maps. One or more sets of activated feature maps from inter-A activation layer 418 and one or more outputs from pre-downsample layer 407 may have the same numbers of channels and dimensions: 256 channels and dimensions of 23×23. The same numbers of channels and dimensions of outputs from different layers may allow the compact convolutional neural network to combine the outputs from the different layers without adding new parameters (e.g., parameters to convert different numbers of channels/dimensions to the same numbers of channels/dimensions, etc.).

The intermediate combination layer may provide shortcut connections within the compact convolutional neural network. Shortcut connections may bypass one or more convolution operations. The shortcut connections may provide for summation of the input to the individual intermediate layer groups with the outputs of the convolution operations within the individual intermediate layer groups. The shortcut connections may provide identity mapping for the compact convolutional neural network. The shortcut connections may provide residual learning function for the compact convolutional neural network. Residual learning function may increase the accuracy and learning rate of the compact convolutional neural network.

One or more intermediate layer groups may not include an activation layer between the first intermediate normalization layer and the intermediate padding layer that applies an activating function to one or more outputs from the layer preceding the individual intermediate layer group. For example, intermediate layer group A 321 may not include an activation layer between inter-A norm layer A 412 and inter-A padding layer 413. Absence of an activation layer between inter-A norm layer A 412 and inter-A padding layer 413 may improve the accuracy of the compact convolutional neural network.

In some implementations, one or more intermediate layer groups may include eight intermediate layer groups as shown in FIG. 3. Intermediate layer group B 322, intermediate layer group C 323, intermediate layer group D 324, intermediate layer group E 325, intermediate layer group F 326, intermediate layer group G 327, and intermediate layer group H 328 may include the same sequence of layers as intermediate layer group A 321, as shown in FIGS. 4A-4H. In some implementations, one or more intermediate layer groups may include seven intermediate layer groups. For example, intermediate layer group H 328 may be removed from structure 300. Other numbers of intermediate layer groups are contemplated.

Downsampling layer component 106 may be configured to effectuate operation of one or more downsampling layers and/or other layers/layer groups. One or more downsampling layers may include one or more downsampling layers between two intermediate layer groups, one or more downsampling layers between an intermediate layer group and a final layer group, and/or other layers. For example, for compact convolutional neural network with eight intermediate layer groups, one or more downsampling layers may include downsampling layer A 331 between intermediate layer group C 323 and intermediate layer group D 324 (shown in FIGS. 3 and 4D), and downsampling layer B 332 between intermediate layer group G 327 and intermediate layer group H 328 (shown in FIGS. 3 and 4H). For compact convolutional neural network with seven intermediate layer groups, downsampling layer B 332 may be located between intermediate layer group G 327 and final layer group 340.

Downsampling layer A 331 may receive one or more outputs from intermediate layer group C 323 and downsample the one or more outputs. Downsampling layer A 331 may receive one or more sets of combined feature maps from inter-C combine layer 439 and downsample the set(s) of combined feature maps. Downsampling layer A 331 may perform downsampling using a max pooling and/or other downsampling methods. Downsampling layer A 331 may include a filter with dimension of 3×3 and may downsample using a stride of 2. Downsampling the set(s) of combined feature maps may reduce the dimensionality of the set(s) of combined feature maps. Downsampling layer A 331 may receive set(s) of combined feature maps with dimensions of 23×23 and output set(s) of combined feature maps with dimensions of 11×11.

Downsampling layer B 332 may receive one or more outputs from intermediate layer group G 327 and downsample the one or more outputs. Downsampling layer B 332 may receive one or more sets of combined feature maps from inter-G combine layer 479 and downsample the set(s) of combined feature maps. Downsampling layer B 332 may perform downsampling using a max pooling and/or other downsampling methods. Downsampling layer B 332 may include a filter with dimension of 3×3 and may downsample using a stride of 2. Downsampling the set(s) of combined feature maps may reduce the dimensionality of the set(s) of combined feature maps. Downsampling layer B 332 may receive set(s) of combined feature maps with dimensions of 11×11 and output set(s) of combined feature maps with dimensions of 5×5.

Final layer group component 108 may be configured to effectuate operation of a final layer group and/or other layers/layer groups. The final layer group may include one or more of a final dropout layer, a final convolution layer, a final activation layer, a first final normalization layer, a final downsampling layer, a final flatten layer, a second final normalization layer, and/or other layers. For example, final layer group 340 may include final drop layer 491, final convolution layer 492, final activation layer 493, final norm layer A 494, final downsample layer 495, final flatten layer 496, final norm layer B 497, and/or other layer.

A final dropout layer may receive one or more outputs from a layer preceding the final layer group. For example, final drop layer 491 may receive one or more outputs from a layer preceding final layer group 340 (inter-H combine layer 489 for compact convolutional neural network with eight intermediate layer groups; downsampling layer B 332 for compact convolutional neural network with seven intermediate layer groups, etc.). The final dropout layer may reduce an overfitting from the received outputs to produce one or more dropped outputs. For example, final drop layer 491 may reduce overfitting from the compact convolutional neural network by dropping filters with a 50 percent probability during training of the compact convolutional neural network.

A final convolution layer may convolve one or more outputs from the layer preceding the final layer group to produce one or more sets of feature maps. For example, final convolution layer 492 may convolve one or more dropped outputs from final drop layer 491 to produce one or more sets of feature maps. Final convolution layer 492 may include a hundred and twenty-eight 1×1 filters and convolve the dropped outputs using a stride of 1. Final convolution layer 492 may convolve dropped outputs having 256 channels and dimensions of 5×5 and produce one or more sets of feature maps having 128 channels and dimensions of 5×5.

A final activation layer may apply an activating function to one or more sets of feature maps. For example, final activation layer 493 may apply an activating function to one or more sets of feature maps from final convolution layer 492 to produce one or more sets of activated feature maps. In some implementations, final activation layer 493 may include a ReLU (Rectified Linear Unit), and/or other activating functions.

First final normalization layer may normalize one or more sets of feature maps. For example, final norm layer A 494 may normalize one or more sets of activated feature maps from final activated layer 493 to produce one or more normalized sets of activated feature maps. Final norm layer 494 may perform normalization using one or more batch normalizing transforms and/or other transforms.

A final downsampling layer may downsample one or more sets of feature maps. For example, final downsample layer 495 may downsample one or more normalized sets of activated feature maps from final norm layer A 494 to produce one or more downsampled sets of activated feature maps. Final downsample layer 495 may perform downsampling using an average pooling and/or other downsampling methods. Final downsample layer 495 may include a filter with dimension of 5×5, and may downsample using a stride of 1. Downsampling normalized sets of activated feature maps may reduce the dimensionality of the normalized sets of activated feature maps. Final downsample layer 495 may receive feature maps with dimensions of 5×5 and output feature maps with dimensions of 1×1.

A final flatten layer may convert one or more sets of feature maps into one or more feature vectors. For example, final flatten layer 496 may convert one or more downsampled sets of activated feature map from final downsample layer 495 into one or more feature vectors. Final flatten layer 496 may receive one or more feature maps having 128 channels and dimensions of 1×1 and output one or more feature vectors having 128 values.

A second final normalization layer may normalize one or more feature vectors. For example, final norm layer B 497 may normalize one or more feature vectors from final flatten layer 496 to produce one or more normalized feature vectors. The normalized feature vectors may be characterized by Euclidian norm that is equal to one or other values. Normalizing the feature vectors may allow for the feature vectors to be projected into a hypersphere of radius corresponding to the normalized value (e.g., 1). Projecting the feature vectors into the hypersphere of radius corresponding to the normalized value may facilitate comparison of the outputs from the compact convolutional neural network (e.g., for comparison of faces for classification, etc.).

In some implementations, precisions for one or more filters within the compact convolutional neural network may be reduced from 32 bits to 5 bits for storage. For example, a value of a filter within the compact convolutional neural network may be calculated to a 32 bit value. The value of the filter may be stored (e.g., in electronic storage 12) using a 5 bit value. Reducing the stored size of filter values may reduce the size of the compact convolutional neural network with minimal loss in the accuracy of the compact convolutional neural network. Precisions for normalization filters may be stored at full precision (e.g., 32 bit).

The compact convolutional neural network of the present disclosure may be used to train filters of the compact convolutional neural network for image processing, image recognition, and/or image classification. Training filters may include minimizing a cost function of the compact convolutional neural network via changing weights of the filters. For example, the compact convolutional neural network may be trained by initializing the filters with random weights for classification. A set of images containing classified faces may be fed through the compact convolutional neural network. The faces may be sampled at random (e.g., images flipped horizontally with probability of 50% for data augmentation) and fed through the compact convolutional neural network to retrieve a likelihood vector indicating likelihood of the face belonging to one or more classified faces. The difference between the predicted identity of the sampled face and the classification may be back propagated through the compact convolutional neural network to update the weights of the filters. The training may finish when the accuracy of the filters do not improve classification (e.g., not improve classification more than a set threshold).

To perform face recognition using the compact convolutional neural network, images containing faces may be fed through the compact convolutional neural network. The compact convolutional neural network may output face descriptors (e.g., vectors of scalars of dimension 128). One or more algorithms (e.g., density-based spatial clustering of applications with noise algorithm, etc.) may be used to cluster the face descriptors. One or more identities may be assigned to individual clusters. For example, all faces in a single cluster may be assigned to the same person.

FIG. 6 summarizes exemplary improvements provided by the compact convolutional neural network of the present disclosure. FIG. 6 shows a comparison of the compact convolutional neural network of the present disclosure with OpenFace, an open source implementation of a convolutional neural network for face recognition. Compared to OpenFace, the compact convolutional neural network may reduce the number of parameters by a factor of 7.87, reduce the size on disk by a factor of 51.5, and provide comparable Labeled Faces in the Wild (LFW) accuracy (92.92% accuracy for OpenFace and 92.3% accuracy for compact convolutional neural network).

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although processor 11 and electronic storage 12 are shown to be connected to an interface 13 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination. Processor 11 may be configured to execute one or more components by software; hardware; firmware; some combination of software, hardware, and/or firmware; and/or other mechanisms for configuring processing capabilities on processor 11.

It should be appreciated that although computer components are illustrated in FIG. 1 as being co-located within a single processing unit, in implementations in which processor 11 comprises multiple processing units, one or more of computer program components may be located remotely from the other computer program components.

The description of the functionality provided by the different computer program components described herein is for illustrative purposes, and is not intended to be limiting, as any of computer program components may provide more or less functionality than is described. For example, one or more of computer program components 102, 104, 106, and/or 108 may be eliminated, and some or all of its functionality may be provided by other computer program components. As another example, processor 11 may be configured to execute one or more additional computer program components that may perform some or all of the functionality attributed to one or more of computer program components 102, 104, 106, and/or 108 described herein.

The electronic storage media of electronic storage 12 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 12 may be a separate component within system 10, or electronic storage 12 may be provided integrally with one or more other components of system 10 (e.g., processor 11). Although electronic storage 12 is shown in FIG. 1 as a single entity, this is for illustrative purposes only. In some implementations, electronic storage 12 may comprise a plurality of storage units. These storage units may be physically located within the same device, or electronic storage 12 may represent storage functionality of a plurality of devices operating in coordination.

FIG. 2A-2D illustrate method 200 for using a compact convolutional neural network system. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201A, an image map may be accessed. At operation 201B, the image map may be normalized. At operation 201C, the dimensionality of the image map may be increased. At operation 201D, the image map may be convolved to produce a first set of feature maps. At operation 201E, a first activating function may be applied to the first set of feature maps. At operation 201F, the first set of feature maps may be normalized. At operation 201G, the first set of feature maps may be downsampled. In some implementations, operations 201A-201G may be performed by a processor component the same as or similar to preliminary layer group component 102 (shown in FIG. 1 and described herein).

One or more iterations of intermediate operations 202A-202J may be performed. At operation 202A, a first output may be received from a first preceding step. At operation 202B, the first output may be convolved to reduce a number of channels of the first output. At operation 202C, the first output may be normalized. At operation 202D, the dimensionality of the first output may be increased. At operation 202E, the first output may be convolved to produce a second set of feature maps. At operation 202F, the first output may be convolved to produce a third set of feature maps. At operation 202G, the second set of feature maps and the third set of feature maps may be concatenated to produce a set of concatenated feature maps. At operation 202H, the set of concatenated feature maps may be normalized. At operation 202I, a second activating function may be applied to the set of concatenated feature maps. At operation 202J, the set of concatenated feature maps and the first output may be combined. In some implementations, operations 202A-202J may be performed by a processor component the same as or similar to intermediate layer group component 104 (shown in FIG. 1 and described herein).

At operation 203, the number of iterations of intermediate operations may be determined. At operation 203A, after third iteration of intermediate operations, a third output may be received from the third iteration. At operation 203B, the third output may be downsampled. At operation 203C, after seventh iteration of intermediate operations, a fourth output may be receive from the seventh iteration. At operation 203D, the fourth output may be downsampled. In some implementations, operations 203A-203D may be performed by a processor component the same as or similar to downsampling layer component 106 (shown in FIG. 1 and described herein).

At operation 204A, a second output may be received from a second preceding step. At operation 204B, an overfitting from the second output may be reduced. At operation 204C, the second output may be convolved to produce a fourth set of feature maps. At operation 204D, a third activating function may be applied to the fourth set of feature maps. At operation 204E, the fourth set of feature maps may be normalized. At operation 204F, the fourth set of feature maps may be downsampled. At operation 204G, the fourth set of feature maps may be converted into a feature vector. At operation 204H, the feature vector may be normalized. In some implementations, operations 204A-204H may be performed by a processor component the same as or similar to final layer group component 108 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A compact convolutional neural network system, the system comprising:
    one or more physical processors configured by machine-readable instructions to process images using a compact convolutional neural network, the compact convolutional neural network including a sequence of layers comprising:
        a preliminary layer group that includes:
            an input layer that accesses an image map,
            a first preliminary normalization layer that normalizes the image map;
            a preliminary padding layer that increases the dimensionality of the image map;
            a preliminary convolution layer that convolves the image map to produce a first set of feature maps;
            a preliminary activation layer that applies a first activating function to the first set of feature maps;
            a second preliminary normalization layer that normalizes the first set of feature maps; and
            a preliminary downsampling layer that downsamples the first set of feature maps;
        one or more intermediate layer groups that includes:
            an intermediate squeeze layer that receives a first output from a layer preceding the individual intermediate layer group and convolves the first output to reduce a number of channels of the first output;
            a first intermediate normalization layer that normalizes the first output;
            an intermediate padding layer that increases the dimensionality of the first output;
            a first intermediate expand layer that convolves the first output to produce a second set of feature maps;
            a second intermediate expand layer that convolves the first output to produce a third set of feature maps;
            an intermediate concatenation layer that concatenates the second set of feature maps and the third set of feature maps to produce a set of concatenated feature maps;
            a second intermediate normalization layer that normalizes the set of concatenated feature maps;
            an intermediate activation layer that applies a second activating function to the set of concatenated feature maps; and
            an intermediate combination layer that combines the set of concatenated feature maps and the first output;
            wherein the one or more intermediate layer groups does not apply an activating function to the first output between normalizing the first output and increasing the dimensionality of the first output; and
        a final layer group that:
            a final dropout layer that receives a second output from a layer preceding the final layer group and reduces an overfitting from the second output;
            a final convolution layer that convolves the second output to produce a fourth set of feature maps;
            a final activation layer that applies a third activating function to the fourth set of feature maps;
            a first final normalization layer that normalizes the fourth set of feature maps;
            a final downsampling layer that downsamples the fourth set of feature maps;
            a final flatten layer that converts the fourth set of feature maps into a feature vector; and
            a second final normalization layer that normalizes the feature vector.

2. The system of claim 1, wherein the one or more intermediate layer groups includes a first intermediate layer group, a second intermediate layer group, a third intermediate layer group, a fourth intermediate layer group, a fifth intermediate layer group, a sixth intermediate layer group, a seventh intermediate layer group, and an eighth intermediate layer group, and the sequence of layers further comprises:
    a first downsampling layer between the third intermediate layer group and the fourth intermediate layer group, the first downsampling layer receiving a third output from the third intermediate layer group and downsampling the third output; and
    a second downsampling layer between the seventh intermediate layer group and the eighth intermediate layer group, the second downsampling layer receiving a fourth output from the seventh intermediate layer group and downsampling the fourth output.

3. The system of claim 1, wherein the one or more intermediate layer groups includes a first intermediate layer group, a second intermediate layer group, a third intermediate layer group, a fourth intermediate layer group, a fifth intermediate layer group, a sixth intermediate layer group, and a seventh intermediate layer group, and the sequence of layers further comprises:
    a first downsampling layer between the third intermediate layer group and the fourth intermediate layer group, the first downsampling layer receiving a third output from the third intermediate layer group and downsampling the third output; and
    a second downsampling layer between the seventh intermediate layer group and the final layer group, the second downsampling layer receiving a fourth output from the seventh intermediate layer group and downsampling the fourth output.

4. The system of claim 1, wherein the first set of feature maps is downsampled using a max pooling and the fourth set of feature maps is downsampled using an average pooling.

5. The system of claim 1, wherein numbers of filters within the compact convolutional neural network are set such that the individual intermediate layer groups are characterized by a same number of input channels and output channels.

6. The system of claim 5, wherein the same number of input channels and output channels is equal to 256.

7. The system of claim 1, wherein precisions for one or more filters within the compact convolutional neural network are reduced from 32 bits to 5 bits for storage.

8. The system of claim 1, wherein the compact convolutional neural network is used to cluster faces within the images.

9. The system of claim 1, wherein the compact convolutional neural network is run on a mobile device.

10. A method for using a compact convolutional neural network to process images, the method comprising:
  accessing, via an input layer, an image map,
  normalizing, via a first preliminary normalization layer, the image map;
  increasing, via a preliminary padding layer, the dimensionality of the image map;
  convolving, via a preliminary convolution layer, the image map to produce a first set of feature maps;
  applying, via a preliminary activation layer, a first activating function to the first set of feature maps;
  normalizing, via a second preliminary normalization layer, the first set of feature maps; and
  downsampling, via a preliminary downsampling layer, the first set of feature maps;
  one or more iterations of:
    receiving, via an intermediate squeeze layer, a first output from a first preceding step:
    convolving, via the intermediate squeeze layer, the first output to reduce a number of channels of the first output;
    normalizing, via a first intermediate normalization layer, the first output;
    increasing, via an intermediate padding layer, the dimensionality of the first output;
    convolving, via a first intermediate expand layer, the first output to produce a second set of feature maps;
    convolving, via a second intermediate expand layer, the first output to produce a third set of feature maps;
    concatenating, via an intermediate concatenation layer, the second set of feature maps and the third set of feature maps to produce a set of concatenated feature maps;
    normalizing, via a second intermediate normalization layer, the set of concatenated feature maps;
    applying, via an intermediate activation layer, a second activating function to the set of concatenated feature maps; and
    combining, via an intermediate combination layer, the set of concatenated feature maps and the first output;
    wherein the one or more iterations does not include applying an activating function to the first output between normalizing the first output and increasing the dimensionality of the first output;
  receiving, via a final dropout layer, a second output from a second preceding step;
  reducing, via the final dropout layer, an overfitting from the second output;
  convolving, via a final convolution layer, the second output to produce a fourth set of feature maps;
  applying, via a final activation layer, a third activating function to the fourth set of feature maps;
  normalizing, via a first final normalization layer, the fourth set of feature maps;
  downsampling, via a final downsampling layer, the fourth set of feature maps;
  converting, via a final flatten layer, the fourth set of feature maps into a feature vector; and
  normalizing, via a second final normalization layer, the feature vector.

11. The method of claim 10, wherein the one or more iterations includes a first iteration, a second iteration, a third iteration, a fourth iteration, a fifth iteration, a iteration, a seventh iteration, and an eighth iteration, and the method further comprises:
  between the third iteration and the fourth iteration, receiving a third output from the third iteration and downsampling the third output; and
  between the seventh iteration and the eighth iteration, receiving a fourth output from the seventh iteration and downsampling the fourth output.

12. The method of claim 10, wherein the one or more iterations includes a first iteration, a second iteration, a third iteration, a fourth iteration, a fifth iteration, a sixth iteration, and a seventh iteration, and the method further comprises:
  between the third iteration and the fourth iteration, receiving a third output from the third iteration and downsampling the third output; and
  between the seventh iteration and receiving the second output from the second preceding step, receiving a fourth output from the seventh iteration and downsampling the fourth output.

13. The method of claim 10, wherein the first set of feature maps is downsampled using a max pooling and the fourth set of feature maps is downsampled using an average pooling.

14. The method of claim 10, wherein numbers of filters within the compact convolutional neural network are set such that the individual iterations are characterized by a same number of input channels and output channels.

15. The method of claim 14, wherein the same number of input channels and output channels is equal to 256.

16. The method of claim 10, wherein precisions for one or more filters within the compact convolutional neural network are reduced from 32 bits to 5 bits for storage.

17. The method of claim 10, wherein the compact convolutional neural network is used to cluster faces within the images.

18. The method of claim 10, wherein the compact convolutional neural network is run on a mobile device.

19. A compact convolutional neural network system, the system comprising:
  one or more physical processors configured by machine-readable instructions to process images using a compact convolutional neural network, the compact convolutional neural network including a sequence of layers comprising:
    a preliminary layer group that includes:
      an input layer that accesses an image map,
      a first preliminary normalization layer that normalizes the image map;
      a preliminary padding layer that increases the dimensionality of the image map;

a preliminary convolution layer that convolves the image map to produce a first set of feature maps;

a preliminary activation layer that applies a first activating function to the first set of feature maps;

a second preliminary normalization layer that normalizes the first set of feature maps; and a preliminary downsampling layer that downsamples the first set of feature maps using a max pooling;

one or more intermediate layer groups that includes:

an intermediate squeeze layer that receives a first output from a layer preceding the individual layer group and convolves the first output to reduce a number of channels of the first output;

a first intermediate normalization layer that normalizes the first output;

an intermediate padding layer that increases the dimensionality of the first output;

a first intermediate expand layer that convolves the first output to produce a second set of feature maps;

a second intermediate expand layer that convolves the first output to produce a third set of feature maps;

an intermediate concatenation layer that concatenates the second set of feature maps and the third set of feature maps to produce a set of concatenated feature maps;

a second intermediate normalization layer that normalizes the set of concatenated feature maps;

an intermediate activation layer that applies a second activating function to the set of concatenated feature maps; and an intermediate combination layer that combines the set of concatenated feature maps and the first output;

wherein the one or more intermediate layer groups does not apply an activating function to the first output between normalizing the first output and increasing the dimensionality of the first output; and a final layer group that includes:

a final dropout layer that receives a second output from a layer preceding the final layer group and reduces an overfitting from the second output;

a final convolution layer that convolves the second output to produce a fourth set of feature maps;

a final activation layer that applies a third activating function to the fourth set of feature maps;

a first final normalization layer that normalizes the fourth set of feature maps;

a final downsampling layer that downsamples the fourth set of feature maps using an average pooling;

a final flatten layer that converts the fourth set of feature maps into a feature vector; and a second final normalization layer that normalizes the feature vector;

wherein numbers of filters within the compact convolutional neural network are set such that the individual intermediate layer groups are characterized by a same number of input channels and output channels, and precisions for one or more of the filters within the compact convolutional neural network are reduced for storage.

20. The system of claim 19, wherein the same number of input channels and output channels is equal to 256, and the precisions for the one or more of the filters within the compact convolutional neural network are reduced from 32 bits to 5 bits for storage.

* * * * *